(12) United States Patent
Bailey et al.

(10) Patent No.: US 8,276,286 B2
(45) Date of Patent: Oct. 2, 2012

(54) DISPLAY FOR COORDINATE MEASURING MACHINE

(75) Inventors: Brent Bailey, Winter Springs, FL (US); Marc M. Barber, Deltona, FL (US); Clark H. Briggs, DeLand, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 44 days.

(21) Appl. No.: 13/006,503

(22) Filed: Jan. 14, 2011

(65) Prior Publication Data
US 2011/0173826 A1 Jul. 21, 2011

Related U.S. Application Data

(60) Provisional application No. 61/296,555, filed on Jan. 20, 2010.

(51) Int. Cl.
*G01B 5/004* (2006.01)
(52) U.S. Cl. .......................... 33/503; 33/1 PT
(58) Field of Classification Search ............... 33/503, 33/534, 1 N, 1 PT
See application file for complete search history.

(56) References Cited

U.S. PATENT DOCUMENTS

| | | |
|---|---|---|
| 1,918,813 A | 2/1932 | Kinzy |
| 2,316,573 A | 4/1943 | Egy |
| 2,748,926 A | 6/1956 | Leahy |
| 2,924,495 A | 2/1960 | Haines |
| 2,966,257 A | 12/1960 | Littlejohn |
| 2,983,367 A | 5/1961 | Paramater et al. |
| 3,066,790 A | 12/1962 | Armbruster |
| 3,458,167 A | 7/1969 | Cooley, Jr. |
| 4,340,008 A | 7/1982 | Mendelson |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |

(Continued)

FOREIGN PATENT DOCUMENTS

DE 3245060 A1 7/1983
(Continued)

OTHER PUBLICATIONS

GoMeasure3D—Your source for all things measurement, Baces 3D 100 Series Portable CMM from GoMeasure3D, [online], [retrieved Nov. 29, 2011], http://www.gomeasure3d.com/baces100.html.

(Continued)

*Primary Examiner* — Yaritza Guadalupe-McCall
(74) *Attorney, Agent, or Firm* — Cantor Colburn LLP

(57) ABSTRACT

A portable articulated arm coordinate measuring machine is provided having a base. A cover is rotatably coupled to the base to move between a closed position and an open position. A display is arranged within the cover. The display includes a screen surface, such as a touch sensitive screen surface, disposed on one side of the housing. The screen surface being adjacent the base in the closed position and disposed on an angle to the base in the open position.

23 Claims, 21 Drawing Sheets

U.S. PATENT DOCUMENTS

| | | |
|---|---|---|
| 4,790,651 A | 12/1988 | Brown et al. |
| 4,816,822 A | 3/1989 | Vache et al. |
| 4,954,952 A | 9/1990 | Ubhayakar et al. |
| 4,996,909 A | 3/1991 | Vache et al. |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,997,779 A | 12/1999 | Potter |
| D423,534 S | 4/2000 | Raab et al. |
| 6,060,889 A | 5/2000 | Hocker |
| 6,067,116 A | 5/2000 | Yamano et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,366,831 B1 | 4/2002 | Raab |
| 6,418,774 B1 | 7/2002 | Brogaardh et al. |
| 6,438,856 B1 | 8/2002 | Kaczynski |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,117,107 B2 | 10/2006 | Dorny et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,372,558 B2 | 5/2008 | Kaufman et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 * | 9/2009 | Crampton ............... 33/503 |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S * | 1/2010 | Cooduvalli et al. ............ D10/63 |
| 7,693,325 B2 | 4/2010 | Pulla et al. |
| 7,701,592 B2 | 4/2010 | Saint Clair et al. |
| 7,712,224 B2 | 5/2010 | Hicks |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |

| | | | | | |
|---|---|---|---|---|---|
| 7,992,314 B2 * | 8/2011 | Strack et al. ............... 33/504 | 2008/0183065 A1 | 7/2008 | Goldbach |
| 8,001,697 B2 * | 8/2011 | Danielson et al. ............ 33/503 | 2008/0196260 A1 | 8/2008 | Petterson |
| 8,028,432 B2 * | 10/2011 | Bailey et al. ............... 33/503 | 2008/0204699 A1 | 8/2008 | Benz et al. |
| 8,082,673 B2 | 12/2011 | Desforges et al. | 2008/0216552 A1 | 9/2008 | Ibach et al. |
| 8,123,350 B2 | 2/2012 | Cannell et al. | 2008/0228331 A1 | 9/2008 | McNerney et al. |
| 2001/0004269 A1 | 6/2001 | Shibata et al. | 2008/0232269 A1 | 9/2008 | Tatman et al. |
| 2002/0032541 A1 | 3/2002 | Raab et al. | 2008/0235969 A1 | 10/2008 | Jordil et al. |
| 2002/0128790 A1 | 9/2002 | Woodmansee | 2008/0235970 A1 | 10/2008 | Crampton |
| 2003/0033104 A1 | 2/2003 | Gooche | 2008/0240321 A1 | 10/2008 | Narus et al. |
| 2003/0053037 A1 | 3/2003 | Blaesing-Bangert et al. | 2008/0246943 A1 | 10/2008 | Kaufman et al. |
| 2003/0167647 A1 | 9/2003 | Raab et al. | 2008/0252671 A1 | 10/2008 | Cannell et al. |
| 2003/0172536 A1 | 9/2003 | Raab et al. | 2008/0256814 A1 | 10/2008 | Pettersson |
| 2003/0172537 A1 | 9/2003 | Raab et al. | 2008/0257023 A1 | 10/2008 | Jordil et al. |
| 2003/0208919 A1 | 11/2003 | Raab et al. | 2008/0263411 A1 | 10/2008 | Baney et al. |
| 2003/0221326 A1 | 12/2003 | Raab et al. | 2008/0271332 A1 | 11/2008 | Jordil et al. |
| 2004/0022416 A1 | 2/2004 | Lemelson et al. | 2008/0282564 A1 | 11/2008 | Pettersson |
| 2004/0040166 A1 | 3/2004 | Raab et al. | 2008/0295349 A1 | 12/2008 | Uhl et al. |
| 2004/0103547 A1 | 6/2004 | Raab et al. | 2008/0298254 A1 | 12/2008 | Eidson |
| 2004/0111908 A1 | 6/2004 | Raab et al. | 2008/0309460 A1 | 12/2008 | Jefferson et al. |
| 2004/0139265 A1 | 7/2004 | Hocker et al. | 2009/0000136 A1 | 1/2009 | Crampton |
| 2004/0162700 A1 | 8/2004 | Rosenberg et al. | 2009/0016475 A1 | 1/2009 | Rischar et al. |
| 2004/0259533 A1 | 12/2004 | Nixon et al. | 2009/0031575 A1 | 2/2009 | Tomelleri |
| 2005/0016008 A1 | 1/2005 | Raab et al. | 2009/0046140 A1 | 2/2009 | Lashmet et al. |
| 2005/0028393 A1 | 2/2005 | Raab et al. | 2009/0046895 A1 | 2/2009 | Pettersson et al. |
| 2005/0085940 A1 | 4/2005 | Griggs et al. | 2009/0049704 A1 | 2/2009 | Styles et al. |
| 2005/0115092 A1 | 6/2005 | Raab et al. | 2009/0083985 A1 | 4/2009 | Ferrari |
| 2005/0144799 A1 * | 7/2005 | Raab et al. ............... 33/503 | 2009/0089004 A1 | 4/2009 | Vook et al. |
| 2005/0151963 A1 | 7/2005 | Pulla et al. | 2009/0089078 A1 | 4/2009 | Bursey |
| 2005/0166413 A1 | 8/2005 | Crampton | 2009/0089233 A1 | 4/2009 | Gach et al. |
| 2005/0188557 A1 * | 9/2005 | Raab et al. ............... 33/503 | 2009/0089623 A1 | 4/2009 | Neering et al. |
| 2005/0259271 A1 | 11/2005 | Christoph | 2009/0109797 A1 | 4/2009 | Eidson |
| 2005/0276466 A1 | 12/2005 | Vaccaro et al. | 2009/0113183 A1 | 4/2009 | Barford et al. |
| 2005/0283989 A1 | 12/2005 | Pettersson | 2009/0113229 A1 | 4/2009 | Cataldo et al. |
| 2006/0016086 A1 * | 1/2006 | Raab et al. ............... 33/503 | 2009/0122805 A1 | 5/2009 | Epps et al. |
| 2006/0026851 A1 | 2/2006 | Raab et al. | 2009/0139105 A1 | 6/2009 | Granger |
| 2006/0028203 A1 | 2/2006 | Kawashima et al. | 2009/0157419 A1 | 6/2009 | Bursey |
| 2006/0053647 A1 | 3/2006 | Raab et al. | 2009/0165317 A1 | 7/2009 | Little |
| 2006/0056459 A1 | 3/2006 | Stratton et al. | 2009/0177435 A1 | 7/2009 | Heininen |
| 2006/0056559 A1 | 3/2006 | Pleasant et al. | 2009/0177438 A1 | 7/2009 | Raab |
| 2006/0059270 A1 | 3/2006 | Pleasant et al. | 2009/0187373 A1 | 7/2009 | Atwell et al. |
| 2006/0096108 A1 | 5/2006 | Raab et al. | 2009/0241360 A1 | 10/2009 | Tait et al. |
| 2006/0123649 A1 | 6/2006 | Muller | 2009/0249634 A1 | 10/2009 | Pettersson |
| 2006/0169050 A1 | 8/2006 | Kobayashi et al. | 2009/0265946 A1 | 10/2009 | Jordil et al. |
| 2006/0287769 A1 | 12/2006 | Yanagita et al. | 2010/0040742 A1 | 2/2010 | Dijkhuis et al. |
| 2006/0291970 A1 | 12/2006 | Granger | 2010/0057392 A1 | 3/2010 | York |
| 2007/0030841 A1 | 2/2007 | Lee et al. | 2010/0078866 A1 | 4/2010 | Pettersson |
| 2007/0043526 A1 | 2/2007 | De Jonge et al. | 2010/0095542 A1 | 4/2010 | Ferrari |
| 2007/0050774 A1 | 3/2007 | Eidson et al. | 2010/0122920 A1 | 5/2010 | Butter et al. |
| 2007/0055806 A1 | 3/2007 | Stratton et al. | 2010/0123892 A1 | 5/2010 | Miller et al. |
| 2007/0058162 A1 | 3/2007 | Granger | 2010/0134596 A1 | 6/2010 | Becker |
| 2007/0097382 A1 | 5/2007 | Granger | 2010/0208062 A1 | 8/2010 | Pettersson |
| 2007/0105238 A1 | 5/2007 | Mandl et al. | 2010/0250175 A1 * | 9/2010 | Briggs et al. ............... 702/91 |
| 2007/0142970 A1 | 6/2007 | Burbank et al. | 2010/0281705 A1 | 11/2010 | Verdi et al. |
| 2007/0147265 A1 | 6/2007 | Eidson | 2010/0286941 A1 | 11/2010 | Merlot |
| 2007/0147435 A1 | 6/2007 | Hamilton et al. | 2010/0318319 A1 | 12/2010 | Maierhofer |
| 2007/0147562 A1 | 6/2007 | Eidson | 2010/0325907 A1 | 12/2010 | Tait |
| 2007/0153297 A1 | 7/2007 | Lau | 2011/0007305 A1 | 1/2011 | Bridges et al. |
| 2007/0163134 A1 | 7/2007 | Eaton | 2011/0007326 A1 | 1/2011 | Daxauer et al. |
| 2007/0176648 A1 | 8/2007 | Baer | 2011/0013199 A1 | 1/2011 | Siercks et al. |
| 2007/0177016 A1 | 8/2007 | Wu | 2011/0019155 A1 | 1/2011 | Daniel et al. |
| 2007/0183459 A1 | 8/2007 | Eidson | 2011/0023578 A1 | 2/2011 | Grasser |
| 2007/0185682 A1 | 8/2007 | Eidson | 2011/0043515 A1 | 2/2011 | Stathis |
| 2007/0217169 A1 | 9/2007 | Yeap et al. | 2011/0107611 A1 | 5/2011 | Desforges et al. |
| 2007/0217170 A1 | 9/2007 | Yeap et al. | 2011/0107612 A1 | 5/2011 | Ferrari et al. |
| 2007/0223477 A1 | 9/2007 | Eidson | 2011/0107613 A1 | 5/2011 | Tait |
| 2007/0248122 A1 | 10/2007 | Hamilton | 2011/0107614 A1 | 5/2011 | Champ |
| 2007/0256311 A1 | 11/2007 | Ferrari | 2011/0111849 A1 | 5/2011 | Sprague et al. |
| 2007/0257660 A1 | 11/2007 | Pleasant et al. | 2011/0112786 A1 | 5/2011 | Desforges et al. |
| 2007/0258378 A1 | 11/2007 | Hamilton | 2011/0173823 A1 * | 7/2011 | Bailey et al. ............... 33/503 |
| 2007/0282564 A1 | 12/2007 | Sprague et al. | 2011/0173824 A1 * | 7/2011 | Barber et al. ............... 33/503 |
| 2008/0046221 A1 | 2/2008 | Stathis | 2011/0173825 A1 * | 7/2011 | Danielson et al. ............ 33/503 |
| 2008/0052936 A1 | 3/2008 | Briggs et al. | 2011/0173826 A1 * | 7/2011 | Bailey et al. ............... 33/503 |
| 2008/0068103 A1 | 3/2008 | Cutler | 2011/0173827 A1 * | 7/2011 | Bailey et al. ............... 33/503 |
| 2008/0080562 A1 | 4/2008 | Burch et al. | 2011/0173828 A1 | 7/2011 | York |
| 2008/0096108 A1 | 4/2008 | Sumiyama et al. | 2011/0175745 A1 * | 7/2011 | Atwell et al. ............... 340/665 |
| 2008/0098272 A1 | 4/2008 | Fairbanks et al. | 2011/0176148 A1 * | 7/2011 | Briggs et al. ............... 356/614 |
| 2008/0148585 A1 | 6/2008 | Raab et al. | 2011/0178754 A1 * | 7/2011 | Atwell et al. ............... 702/95 |
| 2008/0154538 A1 | 6/2008 | Stathis | 2011/0178755 A1 | 7/2011 | York |
| 2008/0179206 A1 | 7/2008 | Feinstein et al. | 2011/0178758 A1 * | 7/2011 | Atwell et al. ............... 702/134 |

| | | | |
|---|---|---|---|
| 2011/0178762 A1 | 7/2011 | York | |
| 2011/0178763 A1* | 7/2011 | Bridges et al. | 33/503 |
| 2011/0178764 A1 | 7/2011 | York | |
| 2011/0178765 A1* | 7/2011 | Atwell et al. | 702/152 |
| 2011/0178766 A1* | 7/2011 | York et al. | 33/503 |
| 2011/0192043 A1 | 8/2011 | Ferrari | |
| 2011/0273568 A1 | 11/2011 | Lagassey | |

FOREIGN PATENT DOCUMENTS

| | | |
|---|---|---|
| DE | 4410775 A1 | 10/1995 |
| DE | 19543763 A1 | 5/1997 |
| DE | 19820307 A1 | 11/1999 |
| DE | 10026357 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006035292 | 1/2008 |
| DE | 102008039838 | 3/2010 |
| DE | 102005036929 B4 | 6/2010 |
| DE | 102008062763 B3 | 7/2010 |
| EP | 0730210 | 9/1996 |
| EP | 0730210 A1 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 | 12/2006 |
| EP | 1734425 A2 | 12/2006 |
| EP | 1429109 B1 | 4/2007 |
| EP | 1764579 B1 | 12/2007 |
| EP | 1878543 | 1/2008 |
| EP | 1967930 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 A | 2/2009 |
| GB | 2452033 A | 2/2009 |
| GB | 2452033 A | 2/2009 |
| JP | 6313710 A | 11/1994 |
| JP | 7210586 A | 8/1995 |
| JP | 2004257927 A | 9/2004 |
| JP | 2006301991 A | 11/2006 |
| WO | 9208568 A1 | 5/1992 |
| WO | 9910706 A1 | 3/1999 |
| WO | 0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 | 8/2005 |
| WO | 2005100908 A1 | 10/2005 |
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |
| WO | 2008027588 | 3/2008 |
| WO | 2008027588 A2 | 3/2008 |
| WO | 2008 047171 | 4/2008 |
| WO | 2008047171 | 4/2008 |
| WO | 2008064276 A3 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011/057130 A2 | 5/2011 |
| WO | 2011057130 | 5/2011 |
| WO | 2012038446 A1 | 3/2012 |

OTHER PUBLICATIONS

It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.

GHOST 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.

Electro-Optical Information Systems, "The Handy Handheld Digitizer" [online], [retrieved on Nov. 29, 2011], http://vidibotics.com/htm/handy.htm.

Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.

MicroScan 3D User Guide, RSI GmbH, 3D Systems & Software, Oberursel, Germany, email: info@rsi-gmbh.de, Copyright RSI Roland Seifert Imaging GmbH 2008.

Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.

Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.

Cho, et al., Implementation of a Precision Time Protocol over Low Rate Wireless Personal Area Networks, IEEE, 2008.

Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.

International Search Report and Written Opinion for International Application No. PCT/US2011/021273 filed Jan. 14, 2011.

International Search Report for International Application No. PCT/2011/020625 mailed Feb. 25, 2011.

International Search Report for International Application No. PCT/US2011/021270 mailed May 2, 2011.

International Search Report for International Application No. PCT2011/021274 filed Jan. 14, 2011.

International Search Report for International Application No. PCT2011/021276 filed Jan. 14, 2011.

International Search Report for International Application No. PCT/US2011/021246 mailed Apr. 12, 2011.

International Search Report for International Application No. PCT/US2011/021249 mailed Apr. 21, 2011.

Internation Search Report for International Application No. PCT/US2011/021250 mailed Apr. 18, 2011.

International Search Report for International Application No. PCT/US2011/021252 mailed Apr. 27, 2011.

International Search Report for International Application No. PCT/US2011/021259 mailed May 25, 2011.

International Search Report for International Application No. PCT/US2011/021262 mailed May 11, 2011.

International Search Report for International Application No. PCT/US2011/021263 mailed May 4, 2011.

International Search Report for International Application No. PCT/US2011/021264 mailed May 31, 2011.

International Search Report for International Application No. PCT/US2011/021272 mailed Apr. 7, 2011.

International Search Report for International Application No. PCT/US2011/021278 mailed May 25, 2011.
Jasperneite, et al., Enhancements to the Time Synchronization Standard IEEE-1588 for a System of Cascaded Bridges, IEEE, 2004.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Written Opinion of the International Searching Authority for International Application No. PCT/US2011/021246 mailed Apr. 12, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion for International Application No. PCT/US2011/021273 mailed Jan. 14, 2011.
Written Opinion of the International Searching Authority for International Application No. PCT/US2011/021278 mailed May 25, 2011.
Written Opinion of the International Searching Authority for International Application No. PCT/US2011/020625 mailed Feb. 25, 2011.
Written Opinion of the International Searching Authority for Internationl Application No. PCT/US2011/021270 mailed May 2, 2011.
Written Opinion for International Application No. PCT2011/021274 filed Jan. 14, 2011.
Written Opinion for International Application No. PCT/US2011/021276 filed Jan. 14, 2011.
International Search Report mailed Apr. 27, 2011 for International Application No. PCT/US2011/021252; references cited in PCT are listed herein.
Written Opinion of the International Searching Authority mailed Apr. 27, 2011 for International Application No. PCT/US2011/021252.
A. Hart; "Kinematic Coupling Interchangeability" Precision Engineering; vol. 28, No. 1; Jan. 1, 2004 pp. 1-15.
ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
International Search Report for International Application No. PCT/US2011/021248 mailed Sep. 19, 2011.
International Search Report for International Application No. PCT/US2011/021253 mailed Sep. 26, 2011.
International Search Report for International Application No. PCT/US2011/021794 mailed Sep. 23, 2011.
Patrick Willoughby; "Elastically Averaged Precision Alignment"; In: "Doctoral Thesis" ; Jun. 1, 2005; Massachusetts Institute of Technology; XP55005620; Abstract 1.1 Motivation; Chapter 3, Chapter 6.
Written Opinion of the International Searching Authority for International Application No. PCT/US2011/021248 mailed Sep. 19, 2011.
Written Opinion of the International Searching Authority for International Application No. PCT/US2011/021794 mailed Sep. 23, 2011.
Information on Electro-Optical Information Systems; EOIS 3D Mini-Moire C.M.M. Sensor for Non-Contact Measuring & Surface Mapping; Direct Dimensions, Jun. 1995.
International Search Report for International Application No. PCT/US2011/021274 mailed May 6, 2011.
International Search Report for International Application No. PCT/US2011/021273 mailed Apr. 20, 2011.
International Search Report for International Application No. PCT/US2011/050787; Mailing date Nov. 3, 2011.
Romer "Romer Absolute Arm Maximum Performance Portable Measurement" (Printed Oct. 2010); Hexagon Metrology, Inc. htt://us:ROMER.com; Hexagon Metrology, Inc., 2010.
Romer Romer Absolute Arm Product Brochure: (2010); Hexagon Metrology; www.hexagonmetrology.com; Hexagon AB, 2010.
Written Opinion of the International Searching Authority for International Application No. PCT/US2011/021253 mailed Sep. 26, 2011.
Written Opinion of the International Searching Authority for International Application No. PCT/US2011/050787 mailed Nov. 3, 2011.
Written Opinion of the International Searching Authority for International Application No. PCT/US2011/021274 mailed May 6, 2011.
Written Opinion of the International Searching Authority for International Application No. PCT/US2011/021253 mailed Mar. 22, 2012.
International Preliminary Report on Patentability for PCT/US2011/021274; Date of Completion Apr. 12, 2012.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retrieved Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
HYDROpro Navigation, Hydropgraphic Survey Software, Trimble, www.trimble.com, Copyright 1997-2003.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
International Preliminary Report on Patentability mailed May 9, 2012 for International Application Serial No. PCT/US2011/021253 International filing date Jan. 14, 2011. Date of Completion May 9, 2012.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.

International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.

* cited by examiner

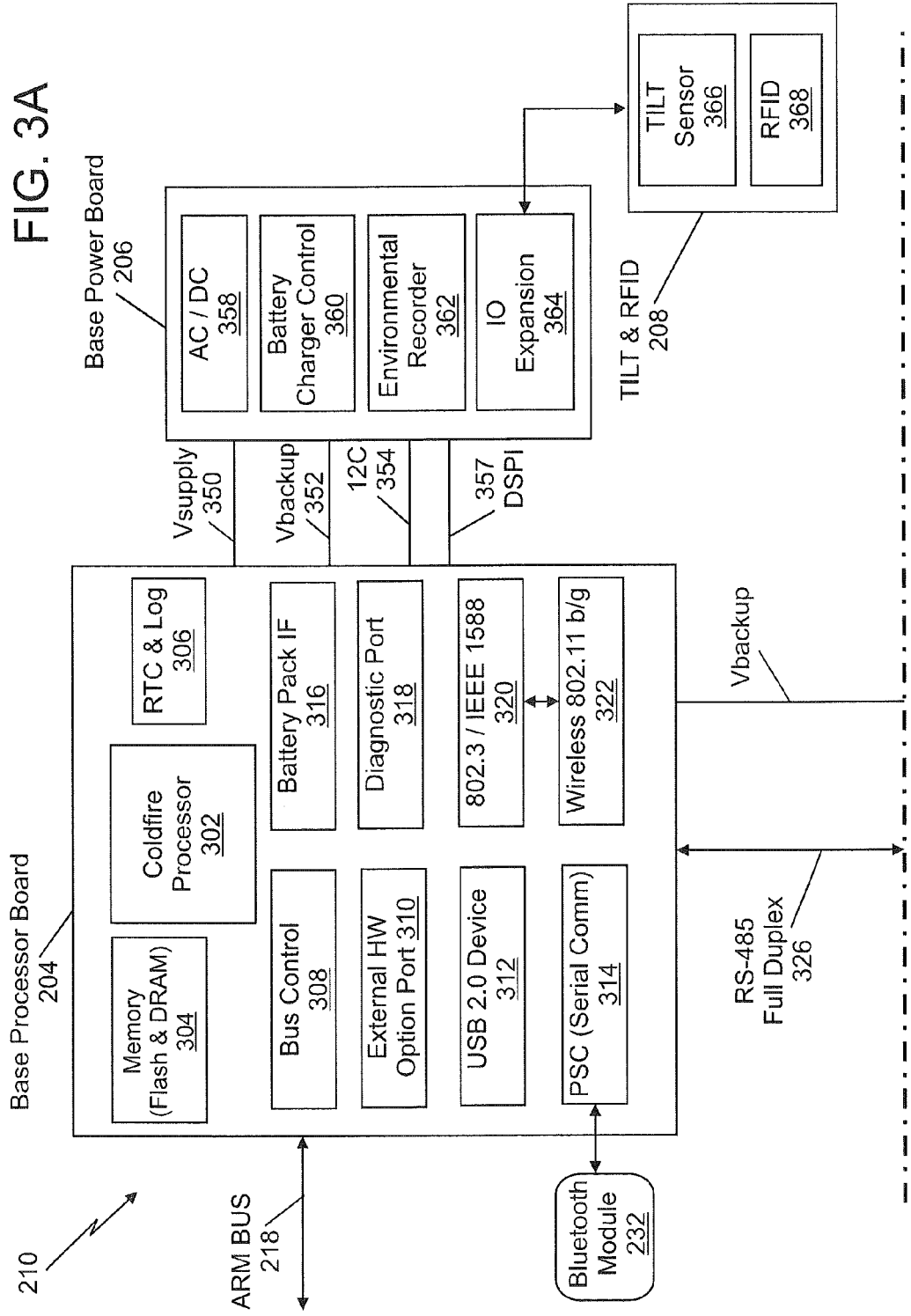

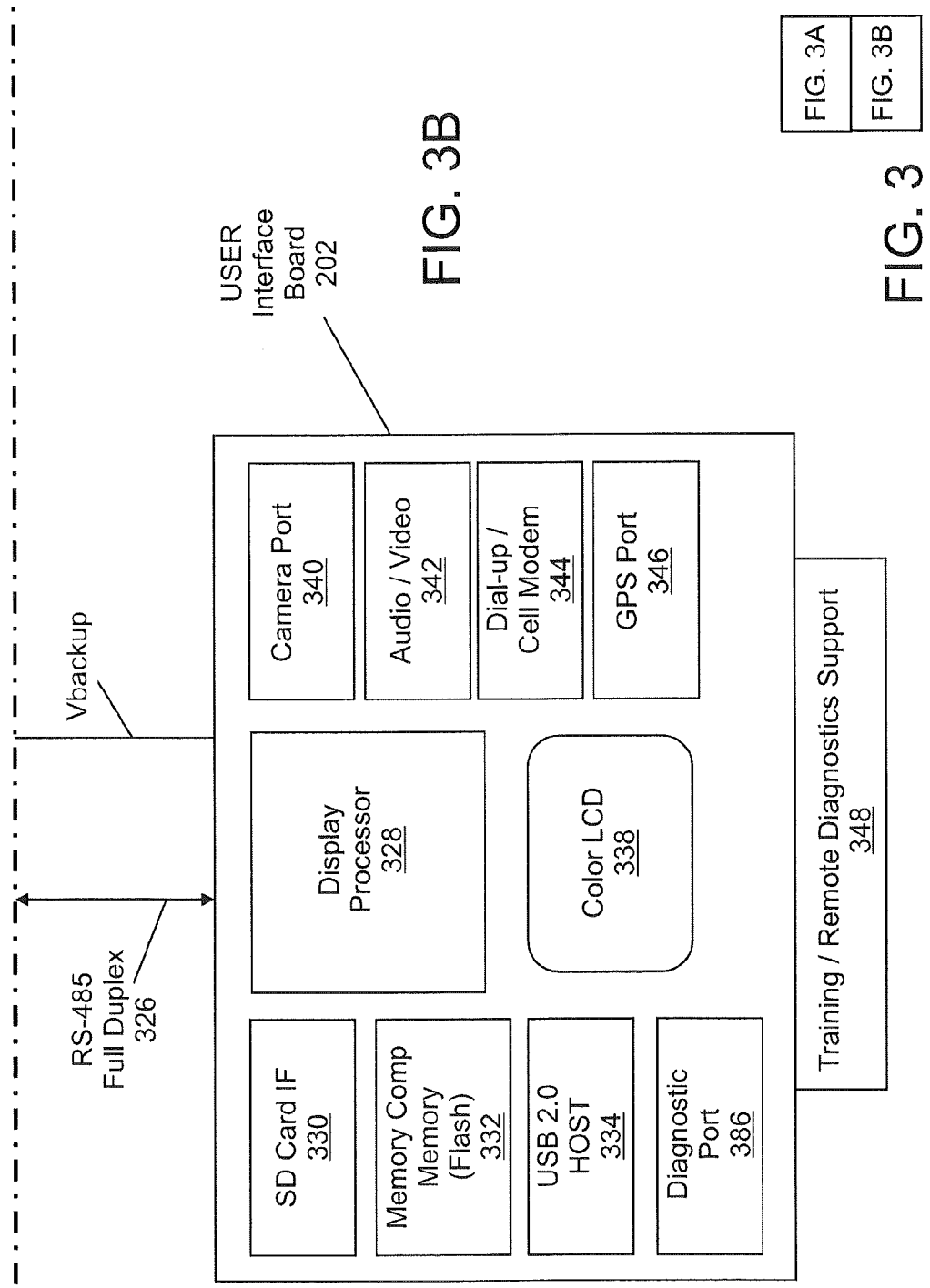

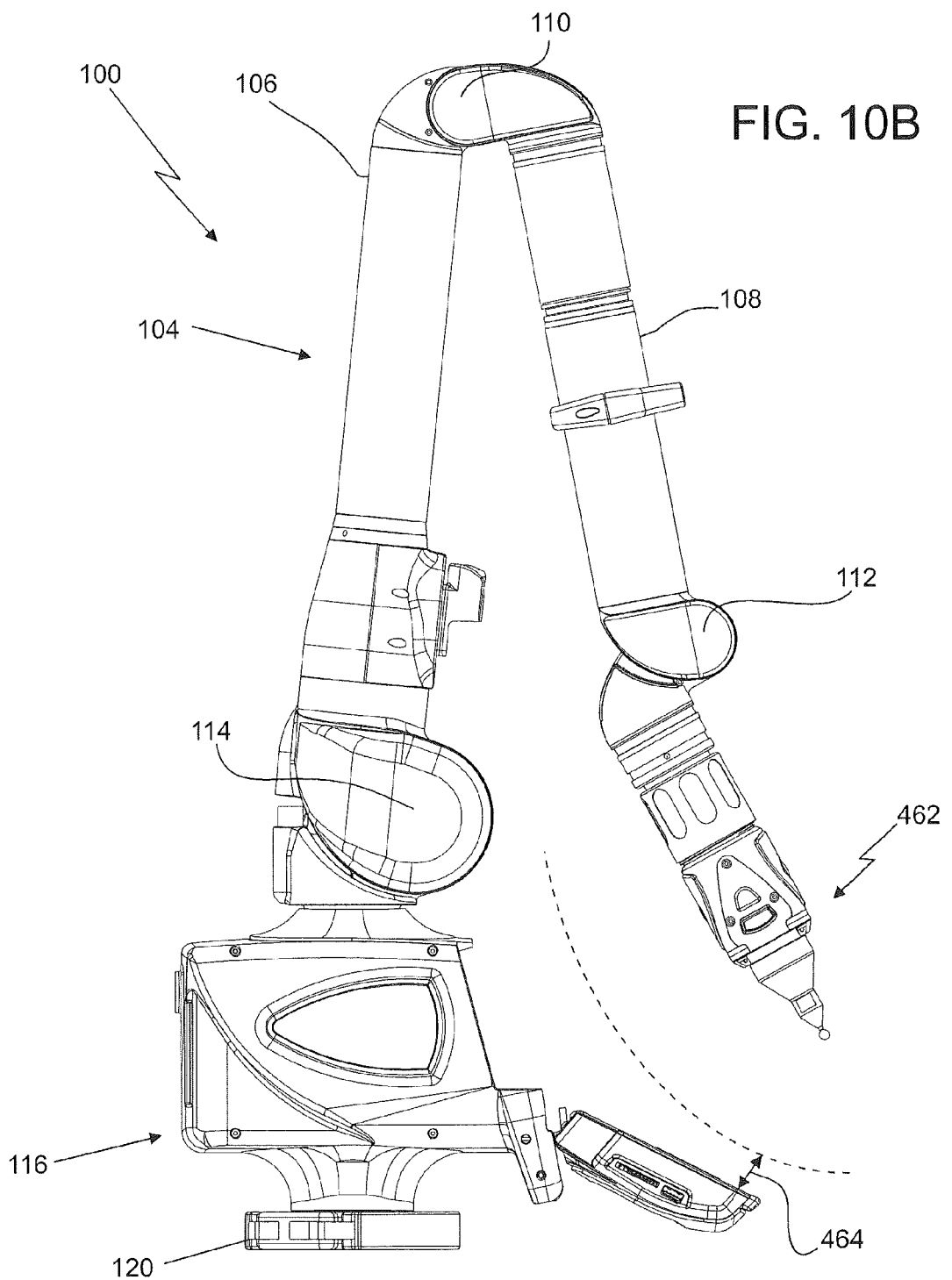

DISPLAY FOR COORDINATE MEASURING MACHINE

CROSS-REFERENCE TO RELATED APPLICATIONS

The present application claims the benefit of provisional application No. 61/296,555 filed Jan. 20, 2010, the content of which is hereby incorporated by reference in its entirety.

BACKGROUND

The present disclosure relates to a coordinate measuring machine, and more particularly to a portable articulated arm coordinate measuring machine having an integral graphical display.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

While existing CMM's are suitable for their intended purposes, what is needed is a portable AACMM that has certain features of embodiments of the present invention.

SUMMARY OF THE INVENTION

In accordance with one embodiment of the invention, a portable articulated arm coordinate measuring machine (AACMM) is provided. The AACMM includes a base. A manually is provided having a positionable articulated arm having opposed first and second ends, the arm being rotationally coupled to the base on the second end, the arm including a plurality of connected arm segments, each arm segment including at least one position transducer for producing a position signal. A measurement device attached to the first end of the AACMM. An electronic circuit is provided which receives the position signals from the transducers and provides data corresponding to a position of the measurement device. A cover is directly coupled to the base. A display is arranged within the cover and electrically coupled to the electronic circuit, the display having a screen surface disposed on one side of the cover.

In accordance with another embodiment of the invention, an AACMM is provided having a base. The AACMM also includes a manually positionable articulated arm having opposed first and second ends, the arm being rotationally coupled to the base on the second end, the arm including a plurality of connected arm segments, each arm segment including at least one position transducer for producing a position signal. A measurement device is attached to the first end. An electronic circuit is provided which receives the position signals from the transducers and provides data corresponding to a position of the measurement device. A display is rotationally coupled to the base between a closed position and an open position, the display having a screen disposed on one side wherein the screen is adjacent the base in the closed position. A controller is operably coupled to the display and coupled for communication to the electronic circuit.

In accordance with yet another embodiment of the invention, an AACMM is provided. The AACMM includes a base. A manually positionable articulated arm is provided having opposed first and second ends, the arm being rotationally coupled to the base on the second end, the arm including a plurality of connected arm segments, each arm segment including at least one position transducer for producing a position signal. A measurement device is attached to the first end. An electronic circuit is provided which receives the position signals from the transducers and provides data corresponding to a position of the measurement device. A display is coupled to the base and electrically coupled to the electronic circuit, the display configured to rotate between a closed position and an open operational position. Wherein the plurality of arm segments are configured to define a path of an outer periphery of travel of the measurement device, the path separated from the display by a gap distance when the display is in the open operational position.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIG. 3, including FIGS. 3A and 3B taken together, is a block diagram describing detailed features of the electronic data processing system of FIG. 2 in accordance with an embodiment;

FIG. 10, including FIGS. 10A and 10B, are side views of the AACMM of FIG. 4 with the articulated arm moved from the first position;

DETAILED DESCRIPTION

Embodiments of the present invention relate to an apparatus and method for providing an integrated display with a portable articulated arm coordinate measuring machine (AACMM). Furthermore, exemplary embodiments of the invention are directed to a display that is rotationally coupled to a base between a closed position and an open position. The display may incorporate a touch sensitive screen display and a controller that are in communication with encoders arranged on an articulated arm. The controller and display cooperate to allow the operator to utilize the AACMM as an independent and standalone measurement device without an external computer or communications connection. Embodiments of the invention provide advantages in preventing the contact between the display and the probe end of the AACMM.

Figure 1A:
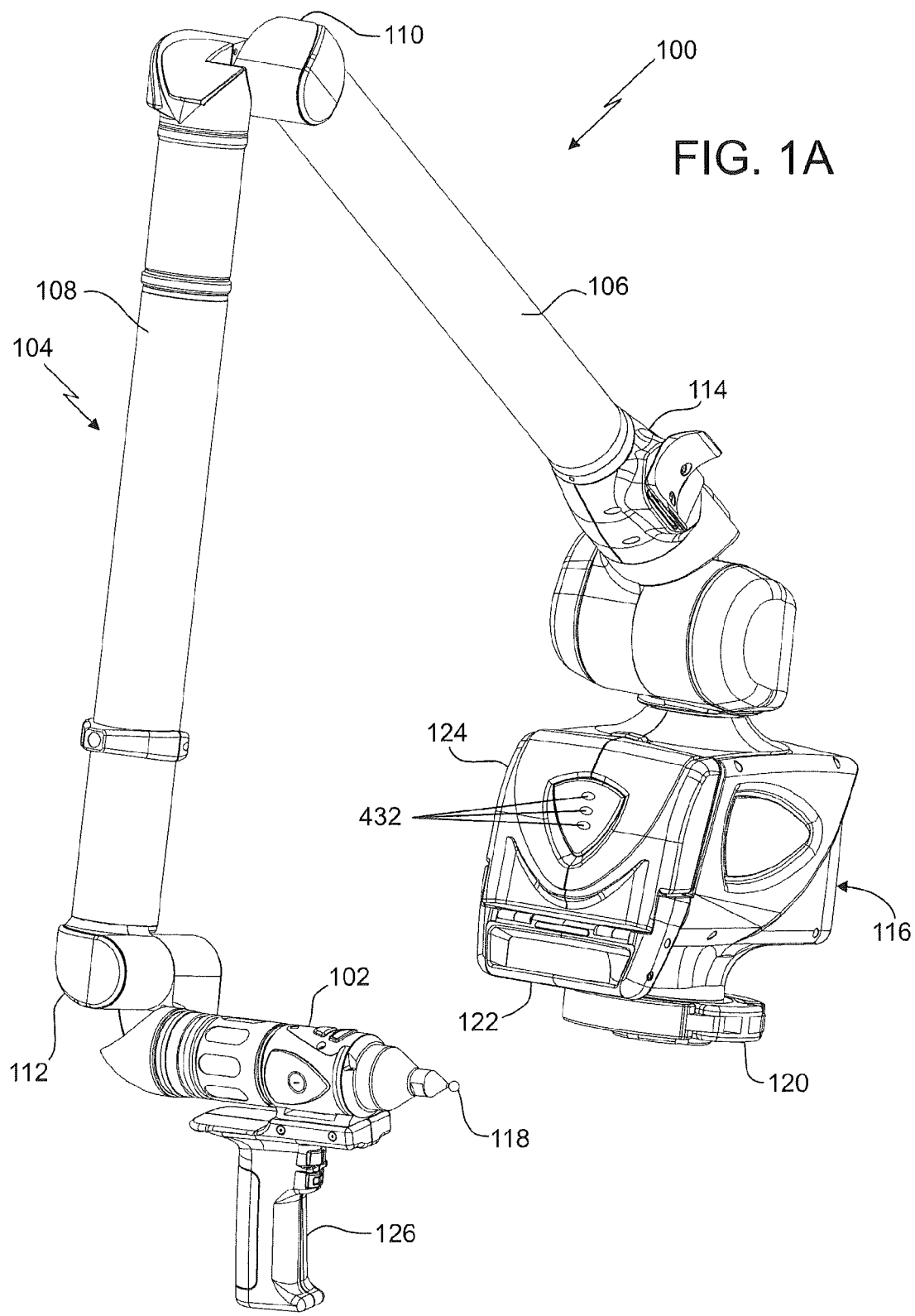
FIGS. 1A and 1B, are perspective views of a portable articulated arm coordinate measuring machine (AACMM) having embodiments of various aspects of the present invention therewithin.
Figure 1B:
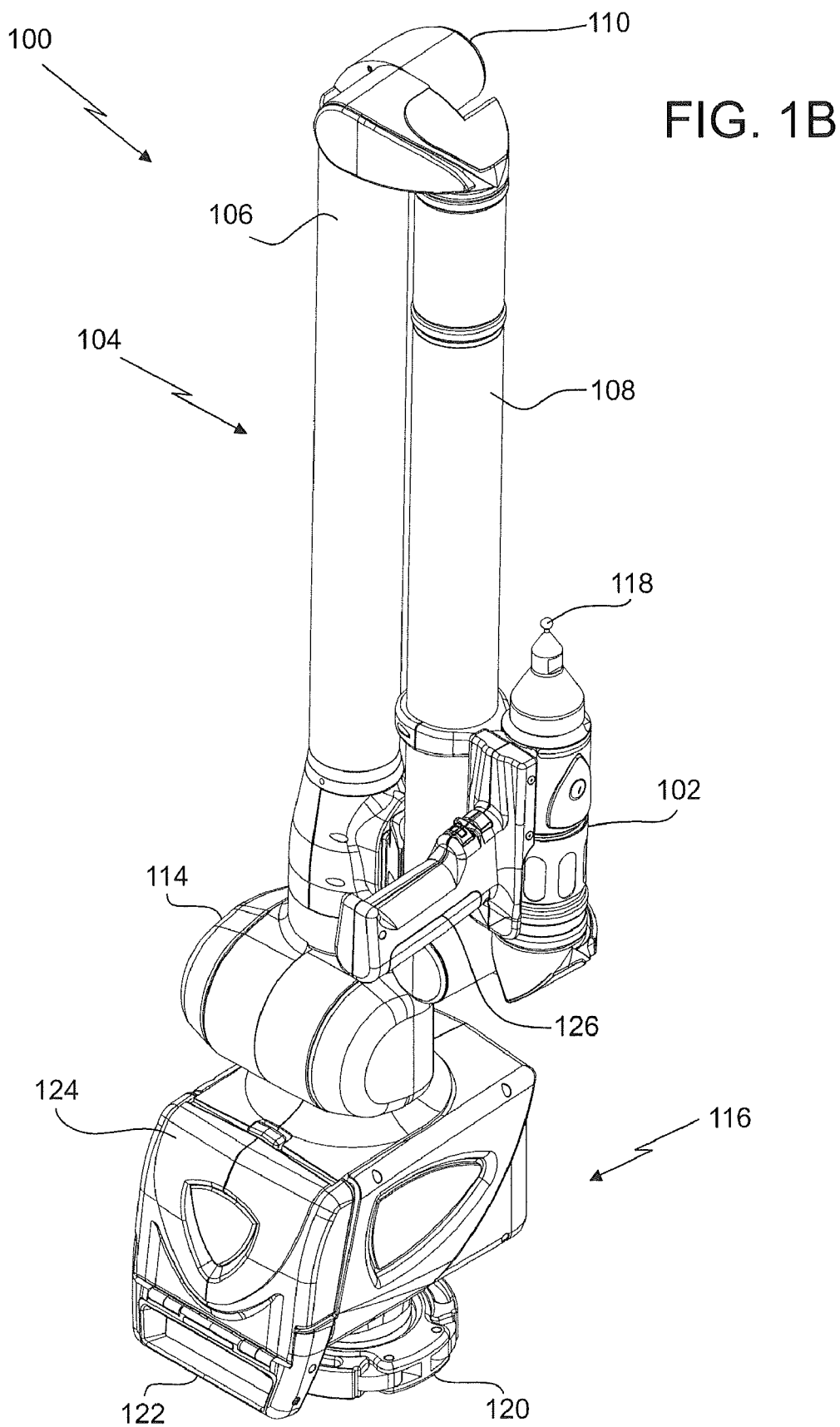

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch sensitive screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
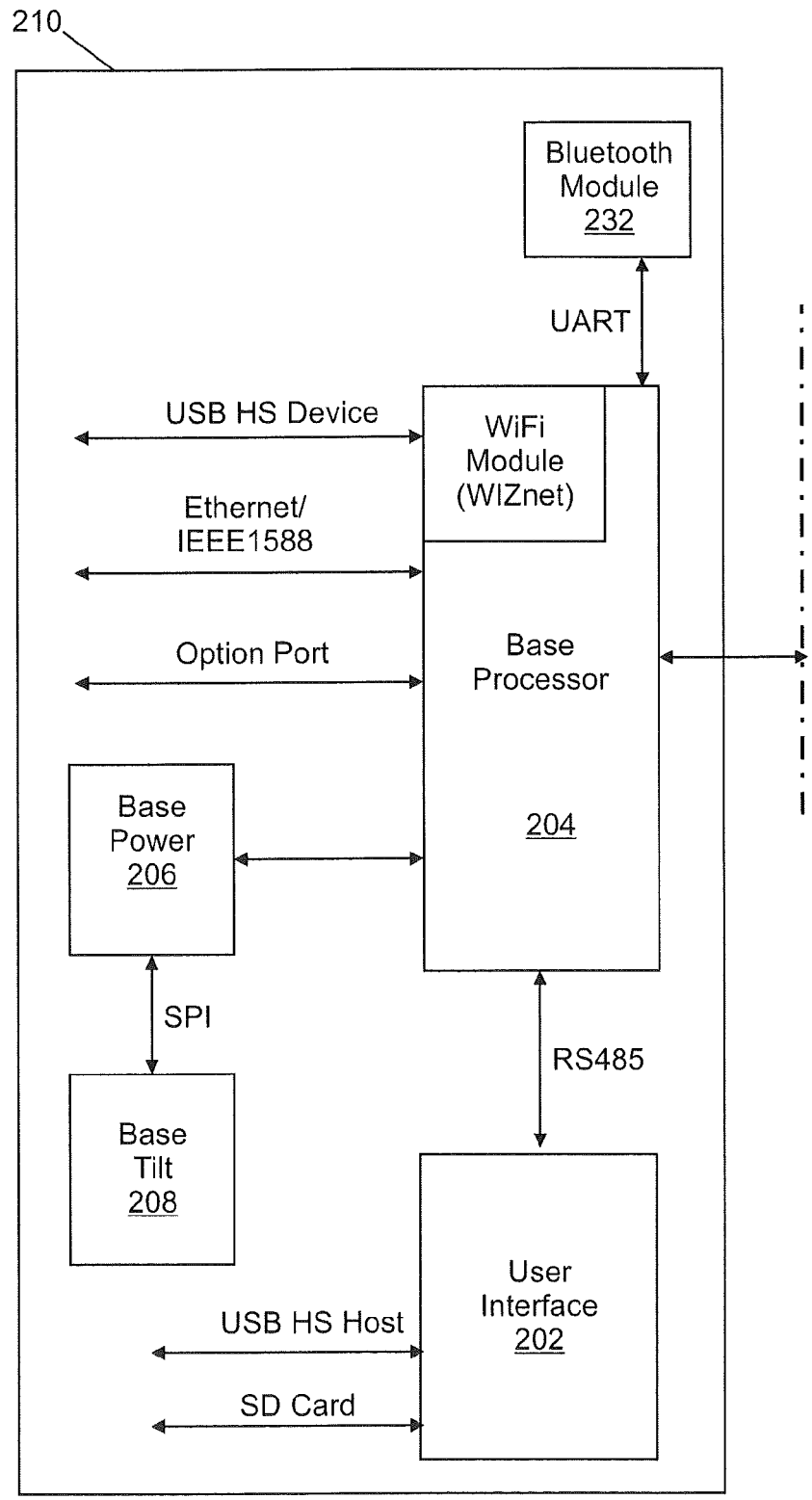
FIG. 2, including FIGS. 2A-2D taken together, is a block diagram of electronics utilized as part of the AACMM of FIG. 1 in accordance with an embodiment.
Figure 2B:
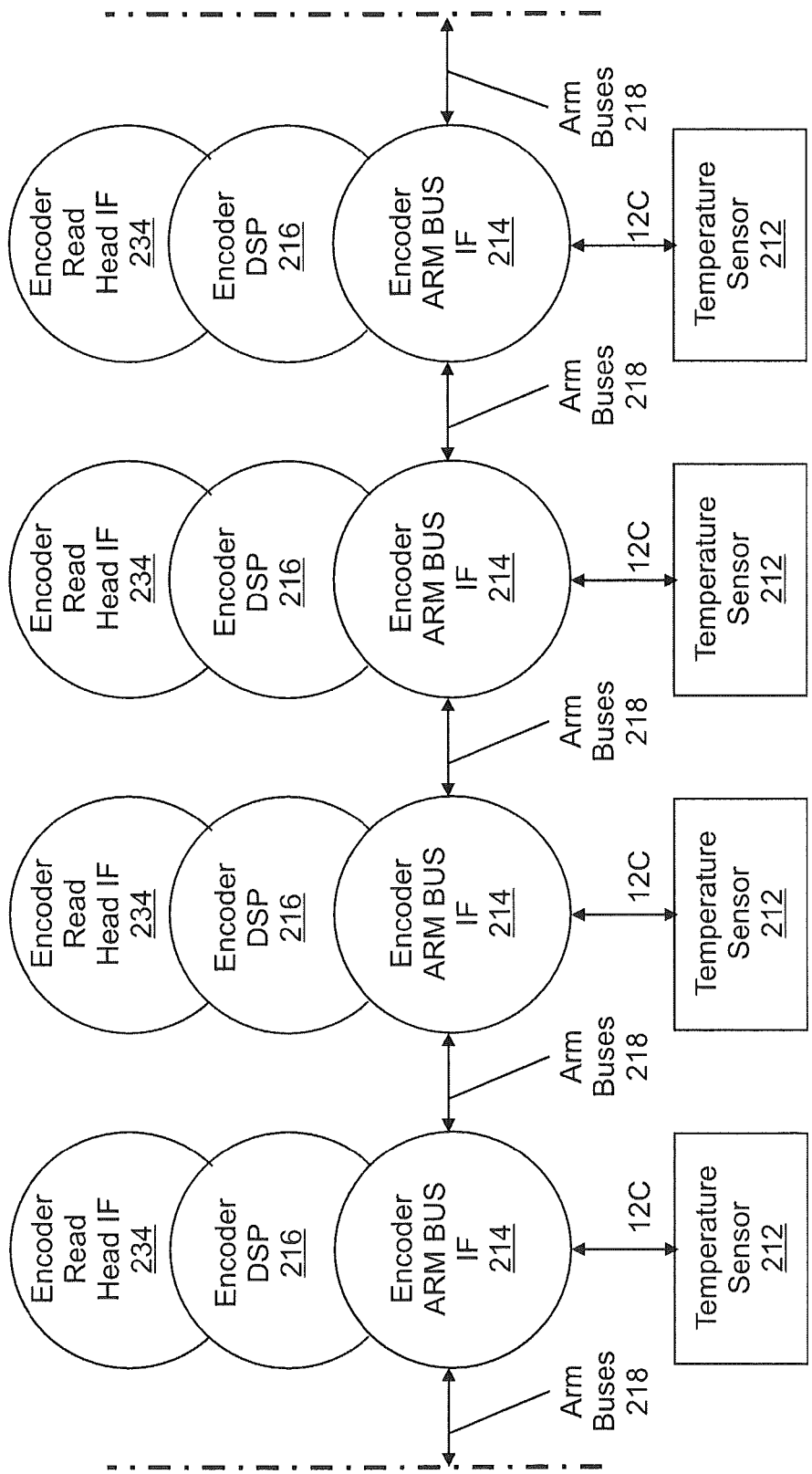
Figure 2C:
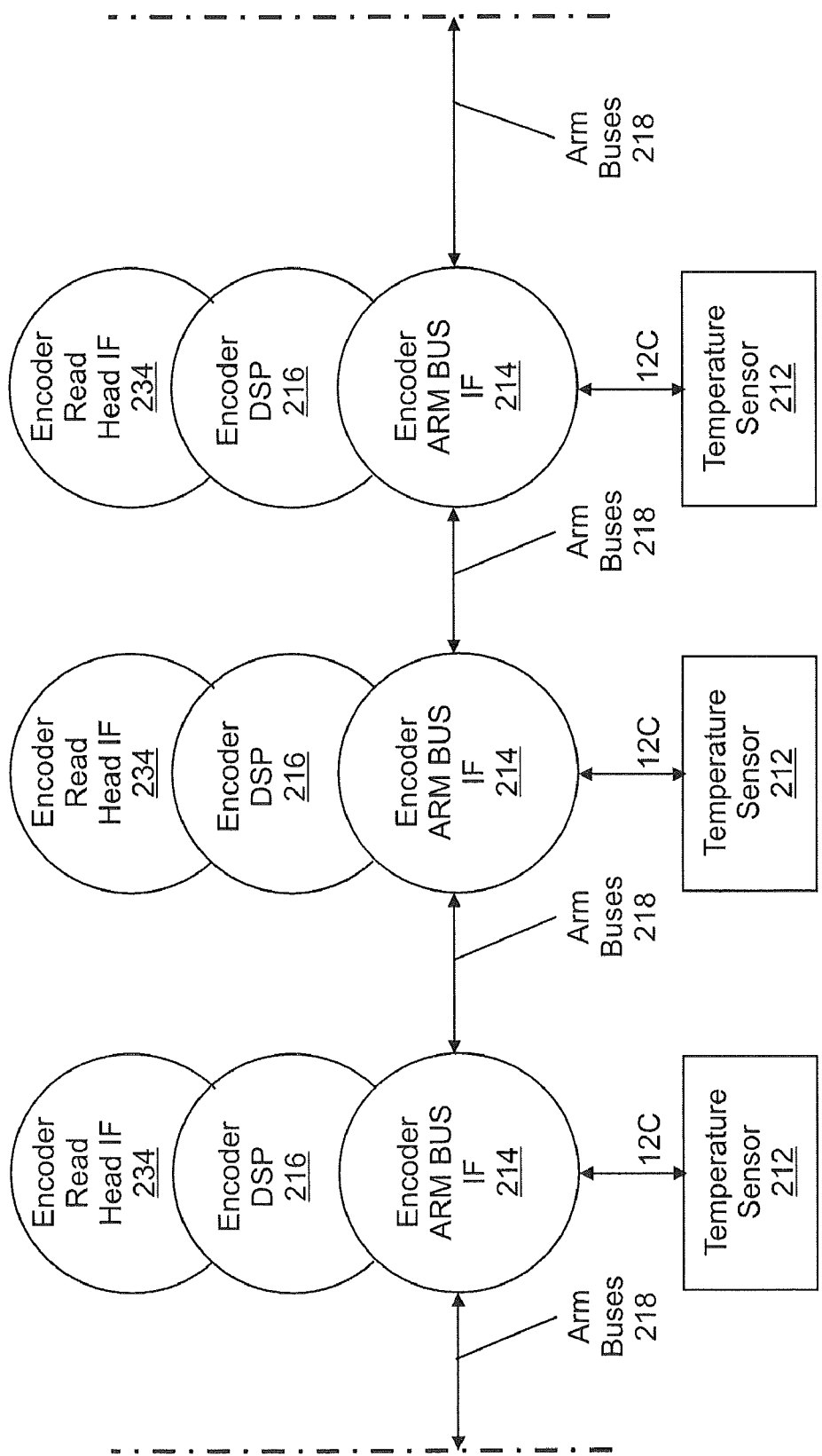
Figure 2D:
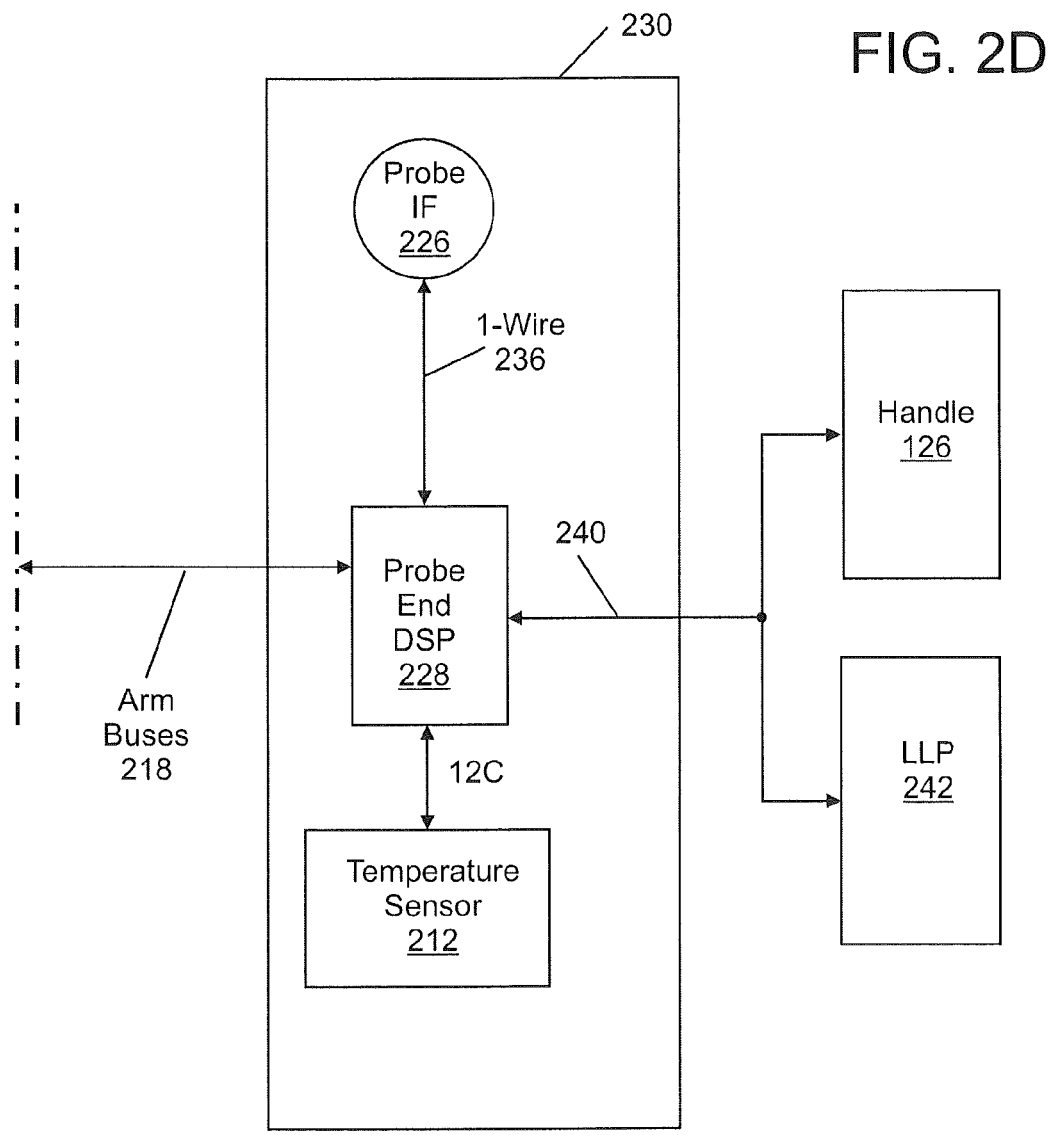
Figure 2:
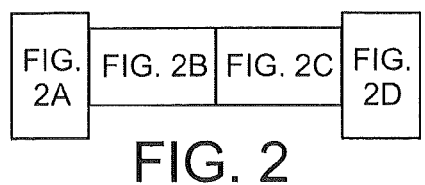

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch sensitive screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Referring to FIG. 1 and FIGS. 4-10, an embodiment is shown of the AACMM 100 having an integrated display. The AACMM 100 includes the base 116 that includes the electronic data processing system 210 that is arranged to communicate via one or more buses 218 with the encoders associated with the bearing cartridge groupings 110, 112, 114. The base 116 includes a housing 400 with the mounting device 120 on one end and the bearing cartridge grouping 114 and arm portion 104 on an opposite end. On one side, the housing 400 includes a recess 402. The recess 402 is defined by an interior wall 404, a first side wall 406, a second side wall 408 and an end wall 410. The side walls 406, 408 are arranged on an angle relative to the mounting plane of the AACMM 100 such that the recess 402 tapers from the end adjacent the mounting device 120 to the end adjacent the arm portion 104. Adjacent the end wall 410, the housing 400 includes a handle portion 122 that is sized to facilitate the carrying of the AACMM 100 by the operator.

In one embodiment, the recess 402 includes an opening 411 sized to receive a battery 413. The battery 413 is removably disposed in the housing 400 and is secured by a latch 415 that is movably disposed in wall 404. The latch 415 may include a tab that engages a surface of the battery 413 and prevents inadvertent removal. The battery 413 is coupled to battery pack interface 316 and provides electrical power for the AACMM 100 when the AACMM 100 is not connected to an external power source (e.g. a wall outlet). In the exemplary embodiment, the battery 413 includes circuitry that communicates with the electronic data processing system 210 and transmits signals that may include but are not limited to: battery charge level; battery type; model number; manufacturer; characteristics; discharge rate; predicted remaining capacity; temperature; voltage; and an almost-discharged alarm so that the AACMM can shut down in a controlled manner.

The end wall 410 may include one or more recessed areas 412 that are sized to receive hinges 414. In the exemplary embodiment, the recessed areas 412 are sized such that the top surface of the hinges 414 is flush or level with the surface of end wall 410. Each hinge 414 includes a first plate that is coupled to the housing 400 by one or more fasteners 416. The first plate includes a barrel portion sized to receive a pin that forms an axis of rotation 418. Each hinge 414 further includes a second plate having a barrel portion coupled to the pin. It should be appreciated that the second plate rotates about the axis 418.

Figure 4:
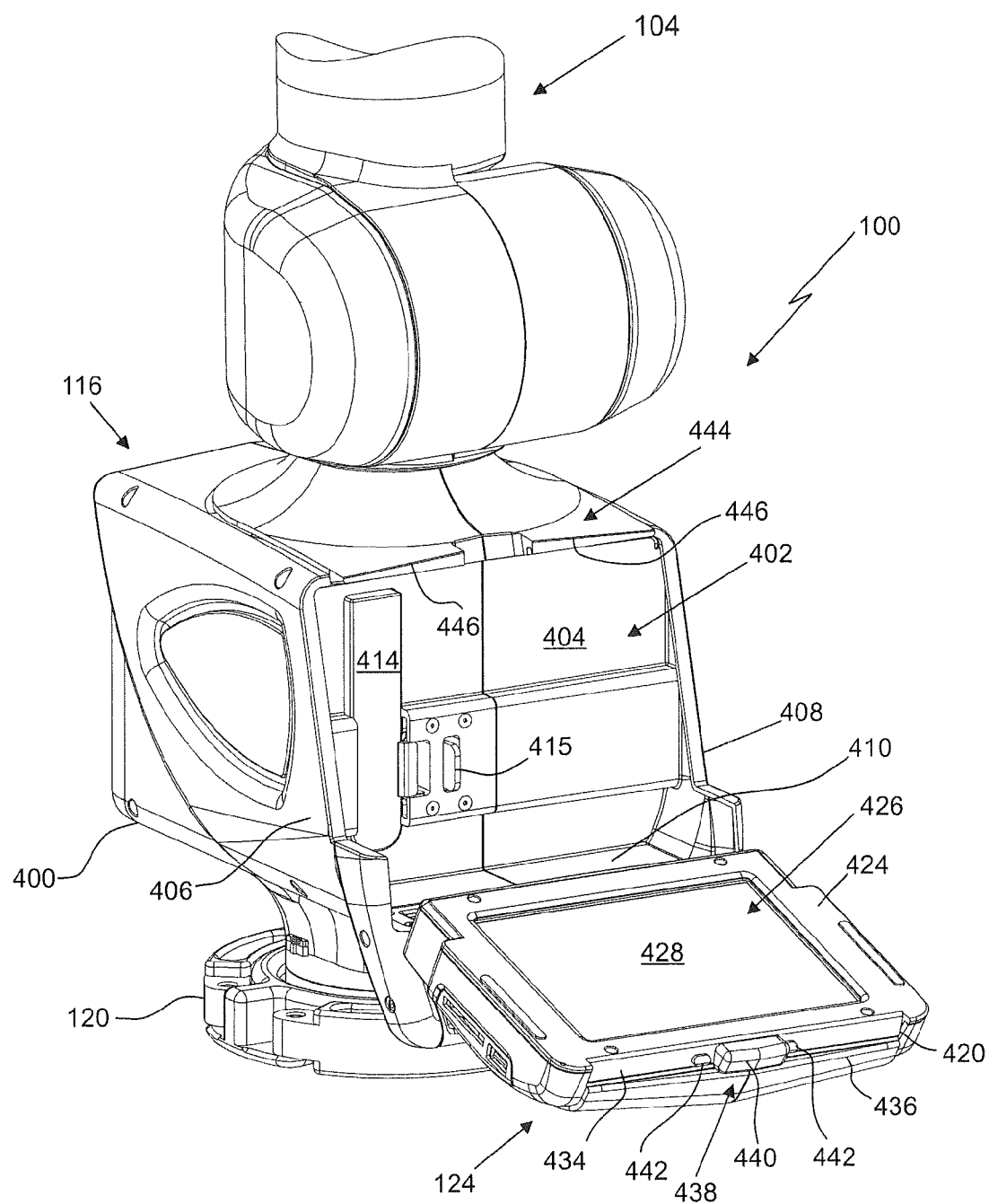
FIG. 4 is a perspective view of the AACMM of FIG. 1 with the display arranged in an open position.
Figure 5:
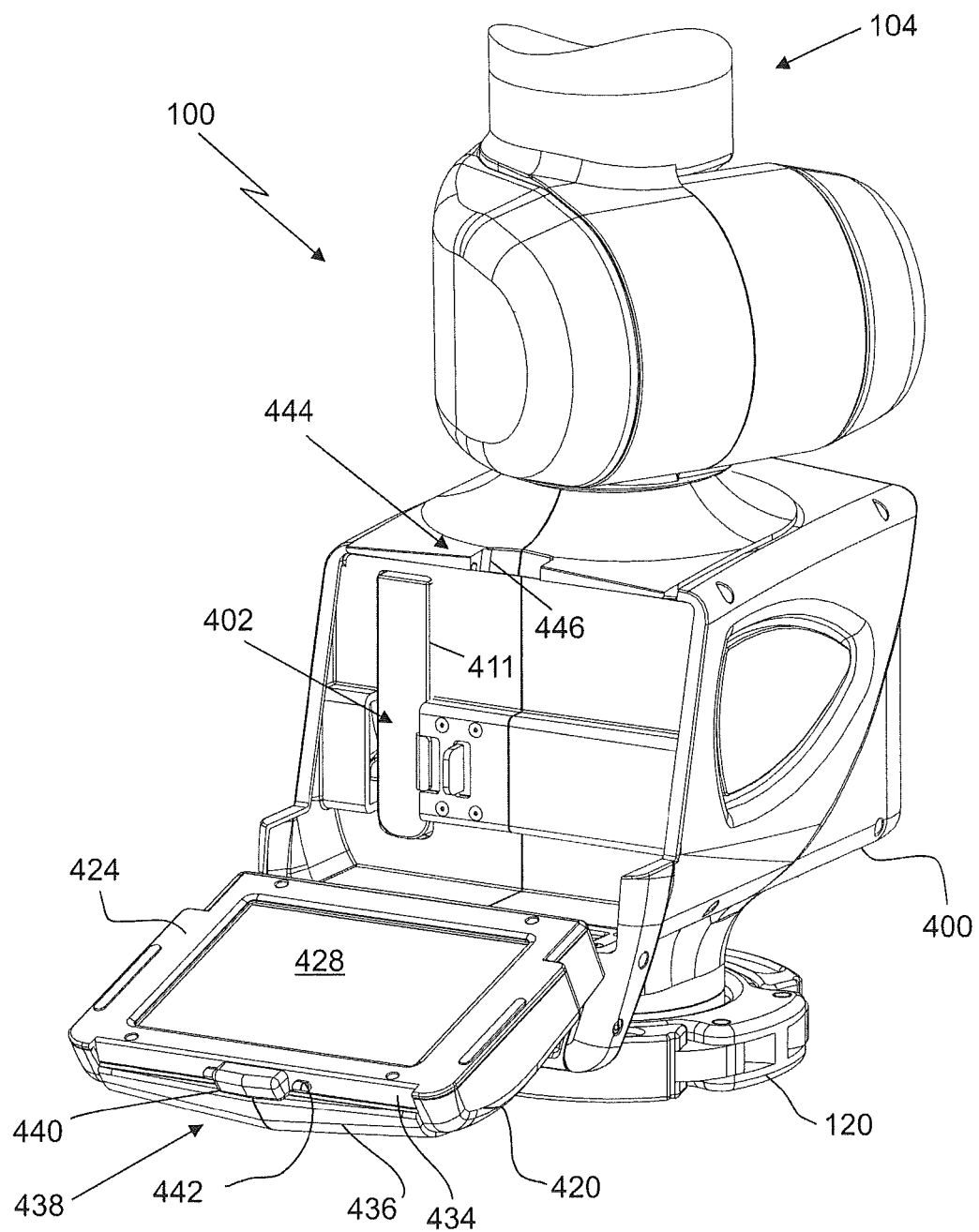
FIG. 5 is another perspective view of the AACMM of FIG. 4.
Figure 6:
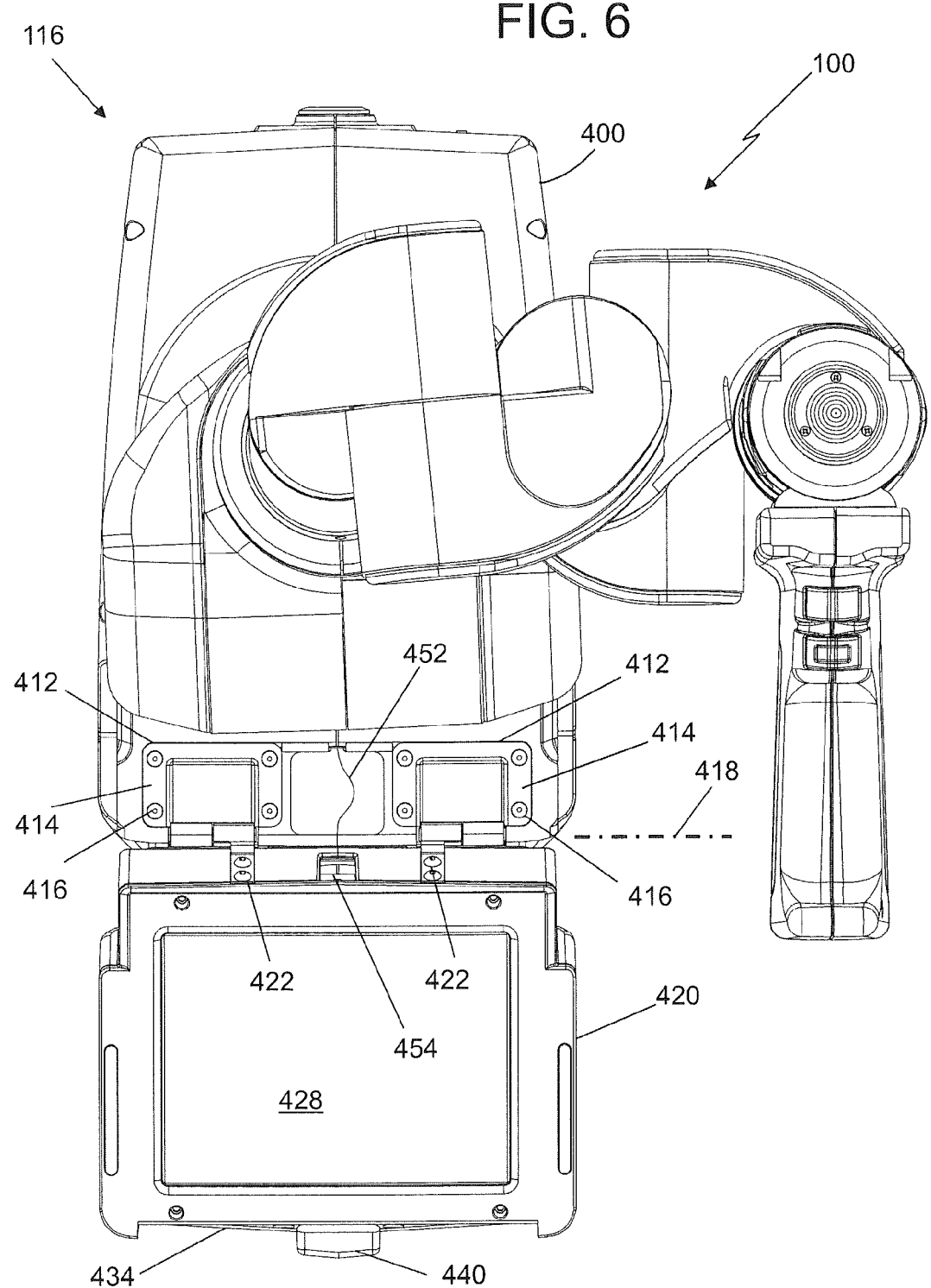
FIG. 6 is a top view of the AACMM of FIG. 4.
Figure 7:
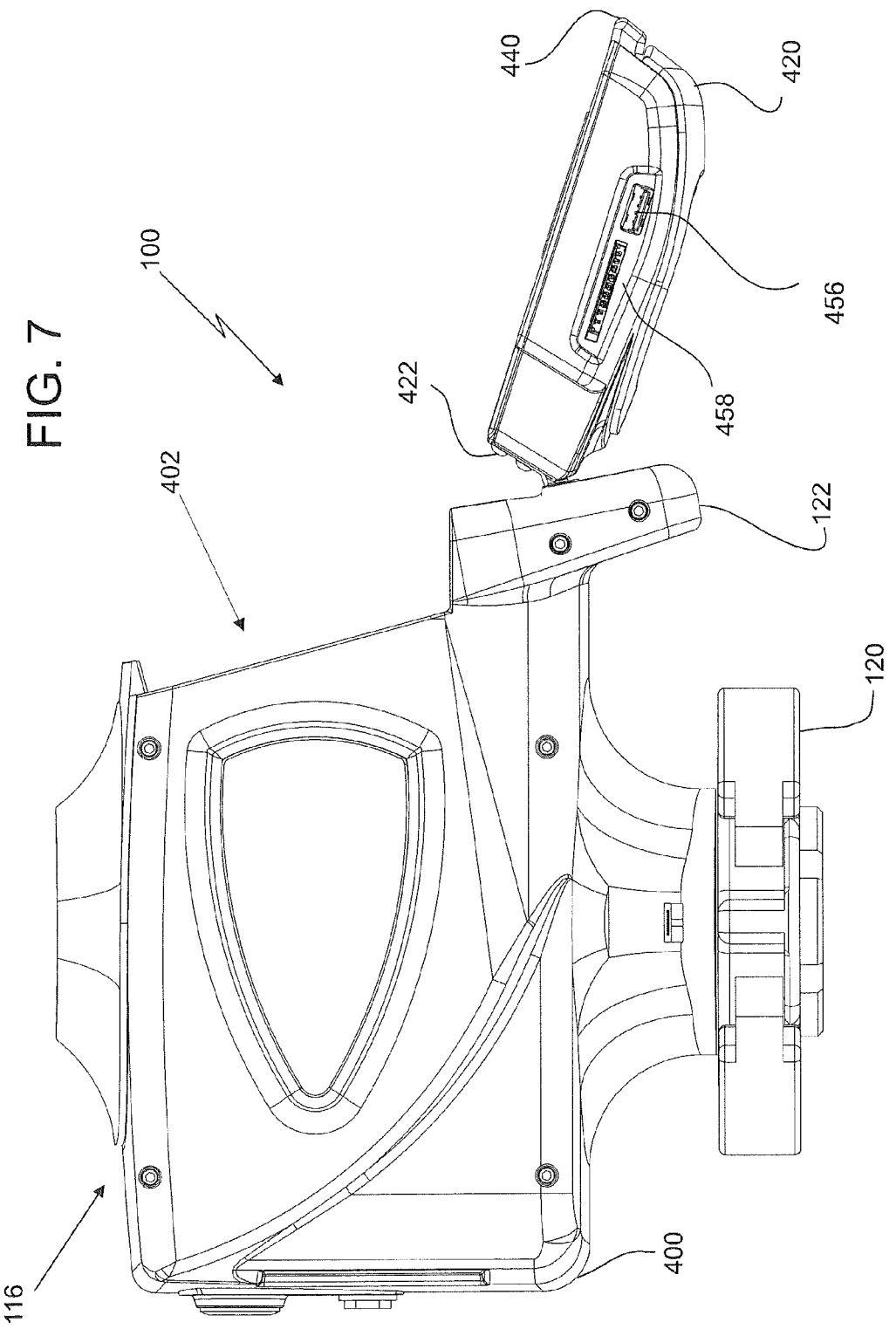
FIG. 7 is a side view of the AACMM of FIG. 4.
Figure 8:
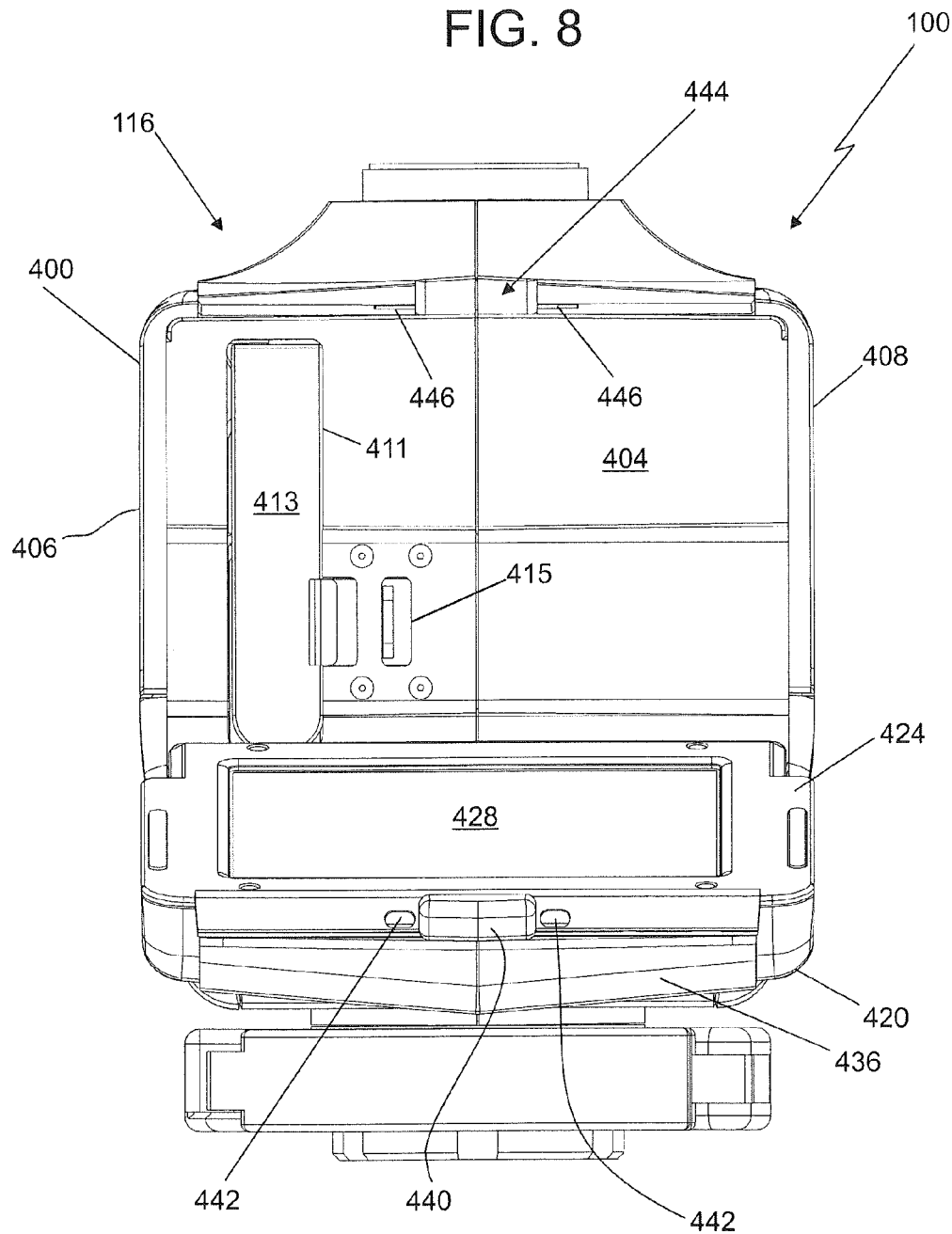
FIG. 8 is a front view of the AACMM of FIG. 4.

The housing 400 includes the movable cover portion 124. The movable cover portion 124 includes a housing member 420 that is mounted to the hinges 414 second plates by one or more fasteners 422. The movable cover portion 124 rotates about the axis 418 between a closed position (FIG. 1A) and an open position (FIG. 4). In the exemplary embodiment, when in the open position, the movable cover portion 124 is arranged at an obtuse angle relative to the interior wall 404. It should be appreciated that the movable cover portion 124 is continuously rotatable and that the open position may be any position at which the operator can access and utilize the display screen. On one side of the housing member 420 one or more indicators 432 (FIG. 1A) are mounted. The indicators 432 are visible to the operator when the movable cover portion 124 is in the closed position. As will be discussed in more detail below, the indicators provide the operator with a visual indication of the communications status and/or the battery level of the AACMM 100.

Figure 9:
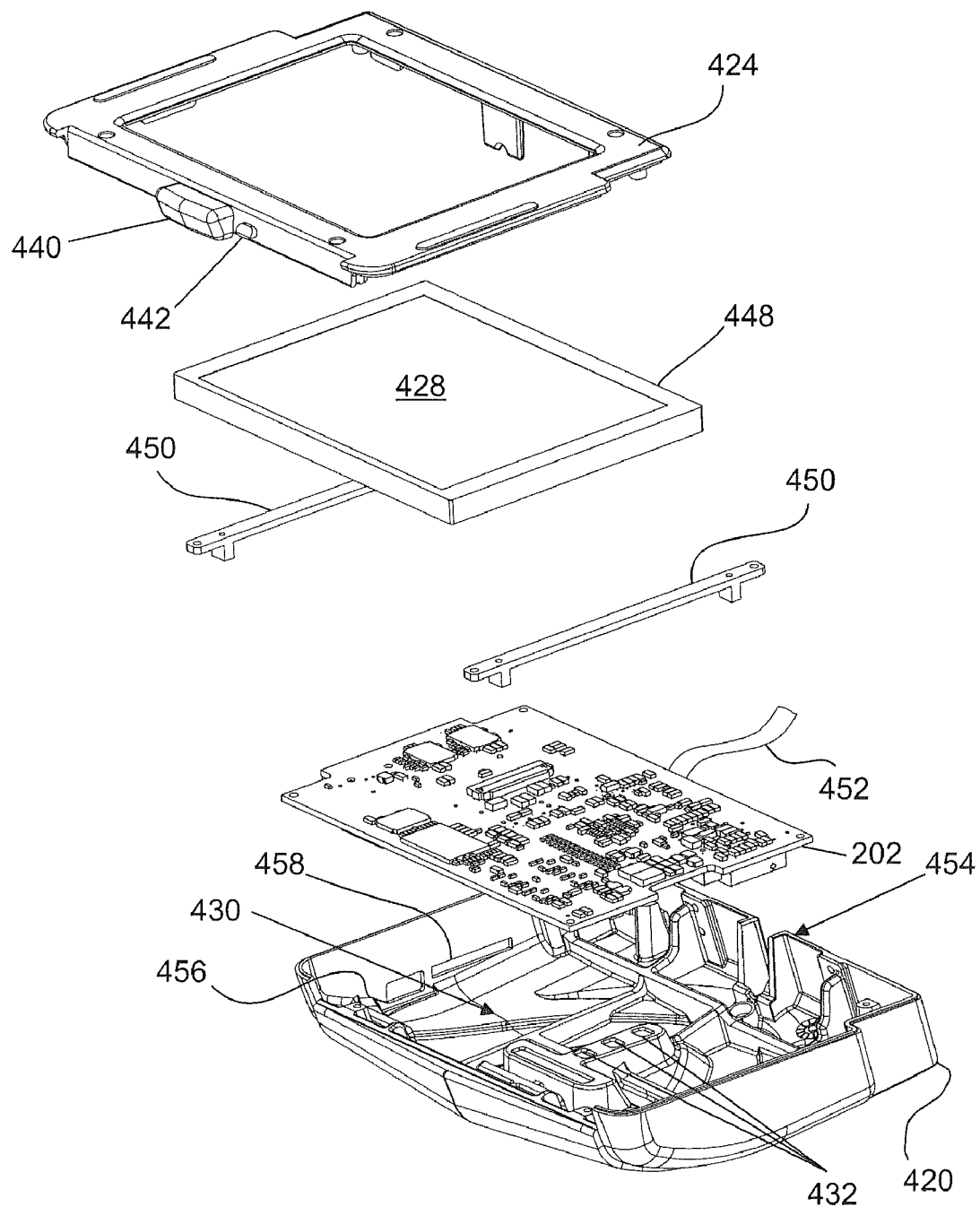
FIG. 9 is an exploded view of the display of FIG. 4.

The movable cover portion 124 further includes a face member 424 disposed on one side and coupled to the housing member 420. The face member 424 includes an opening 426 sized to allow the viewing of a display screen 428. The housing member 420 and face member 424 are generally thin wall structures, formed from an injection molded plastic material for example, that define a hollow interior portion 430 (FIG. 9). In one embodiment the housing member 420 or face member 424 may be formed from other materials, including but not limited to steel or aluminum sheet metal for example. On an end opposite the hinges 414, the housing member 420 includes a recessed area 434. Adjacent the recessed area 434 is a projection 436 that provides a handle that facilitates the opening of the movable cover portion 124 when in the closed position. Within the recessed area 434 is a latch member 438. The latch member 438 includes a spring loaded lever 440 coupled to one or more members 442. The members 442 are arranged to move substantially perpendicular to the surface of the recessed area 434 in response to movement of the lever 440. The latch member 438 is positioned such that when the movable cover portion 124 is rotated to the closed position, the lever fits within an opening 444 along the top of the recess 402. Adjacent the opening 444 are a pair of slots 446 sized to receive the member 442. When in the closed position, the slots 446 retain the members 442 and prevent the movable cover portion 124 from accidentally opening. To open the movable cover portion 124, the operator presses on the lever 440 causing the spring loaded members 442 to retract within the housing member 420. Once the members 442 are retracted, the movable cover portion 124 is free to rotate.

Arranged within the movable cover portion 124 is a display 448 having display screen 428. The display 448 is mounted to the face member 424. The display 448 provides a user interface that allows the operator to interact and operate the AACMM 100 without utilizing or connecting an external host computer. The display 448 may display information relative to the operations being conducted with the AACMM 100, such as but not limited to the displaying of data derived from the positional encoders. In one embodiment, the display screen 428 is an LCD screen that can detect presence and location of a touch, such as by the operator's finger or a stylus for example, within the display area. The display 448 may include a touch sensitive screen having elements for detecting the touch that include but are not limited to: resistive elements; surface acoustic wave elements; capacitive elements; surface capacitance elements; projected capacitance elements; infrared photodetector elements; strain gauge elements; optical imaging elements; dispersive signal elements; or acoustic pulse recognition elements. The display 448 is arranged in bidirectional communication with the user interface board 202 and the base processor board 204 such that actuation of the display 448 by the operator may result in one or more signals being transmitted to or from the display 448. In the exemplary embodiment, the display screen 428 is arranged within the opening 426.

Disposed on either side of the display 448 are standoff frames 450. The frames 450 couple the user interface board 202 to the face member 424. The user interface board is electrically coupled to the display 448 and the indicators 432.

The user interface board is coupled to the base processor board 204 by an interface connection, such as conductor 452 for example. The conductor 452 exits the housing member 420 by an opening 454 arranged between the hinges 422 in the end of the housing member 420.

In one embodiment, the housing member 420 further includes a pair of openings 456, 458 that are sized to receive computer interfaces that allow the operator to connect the user interface board 202 to an external device such as but not limited to: a computer; a computer network; a laptop; a barcode scanner; a digital camera; a digital video camera; a keyboard; a mouse; a printer; a personal digital assistant (PDA); or a cellular phone for example. In one embodiment, the opening 456 is sized to fit USB host interface 334 and opening 458 is sized to fit a secure digital card interface 330. As discussed above, the user interface board 202 includes a processor 328 that is arranged in bidirectional communication to accept and transmit signals from the display screen 428 and the electronic data processing system 210.

Figure 10A:
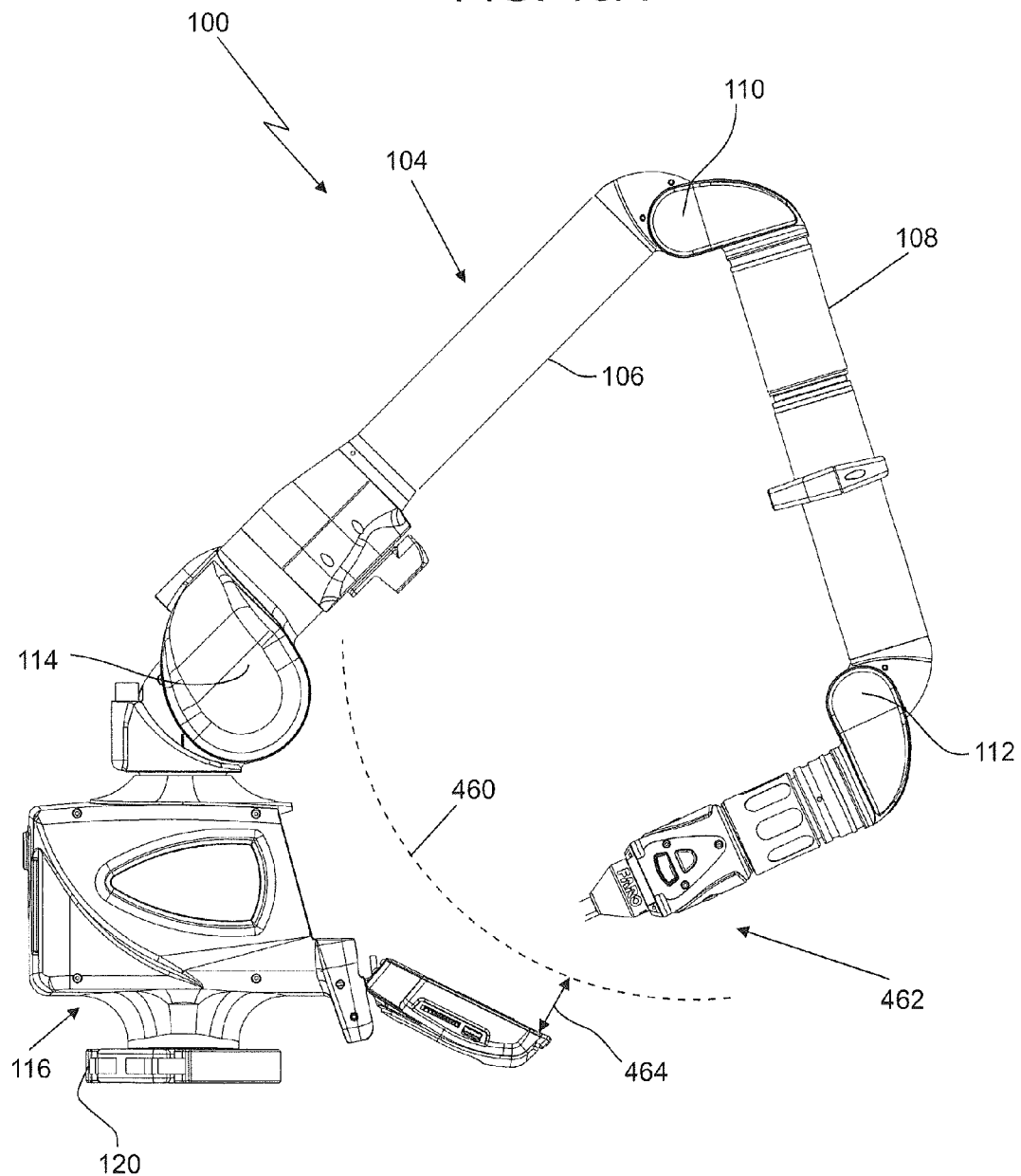

It should be appreciated that when the movable cover portion 124 is in the open position it is desirable to prevent or minimize impacts on the display screen 428. In the exemplary embodiment, the arm portion 104 is configured such that the position and length of the arm segments 106, 108 do not allow the probe housing 102, a probe tip 118 or the handle 126 to impact the display screen 428 as the probe end 462 of the arm portion 104 is moved about the area adjacent the movable cover portion 124. As shown in FIG. 10, the travel of the arm portion 104 results in a path 460 that defines an outer periphery of travel for the probe end 462 that results in a gap distance 464 between the closest part of the probe end 462 (e.g., probe tip 118) and the display screen 428 when the display screen 428 is in an open operational position. In one embodiment, movable cover portion 124 is fully open in the open operational position. The path 460 is arranged such that as the probe end 462 moves downward (e.g., towards the mounting ring end) the probe end 462 is carried away from the base 116 such that the probe end 462 does not impact or contact the display screen 428. It should be appreciated that providing the gap distance 464 with a distance greater than zero provides an advantage in reducing or eliminating the potential for contact between the display screen 428 and the probe tip 118.

Figure 11:
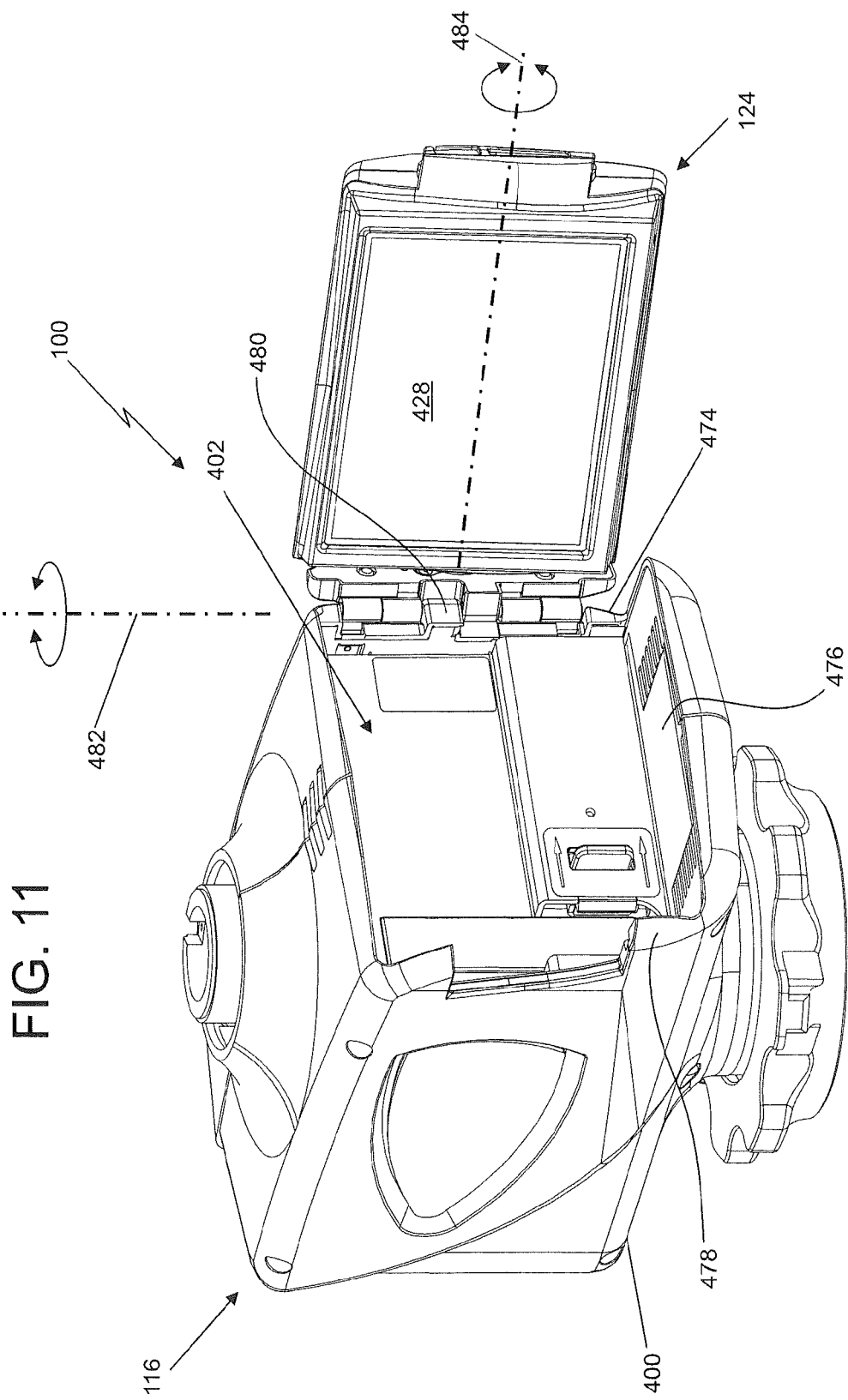
FIG. 11 is a perspective view of an AACMM in accordance with another embodiment of the invention.
Figure 12:
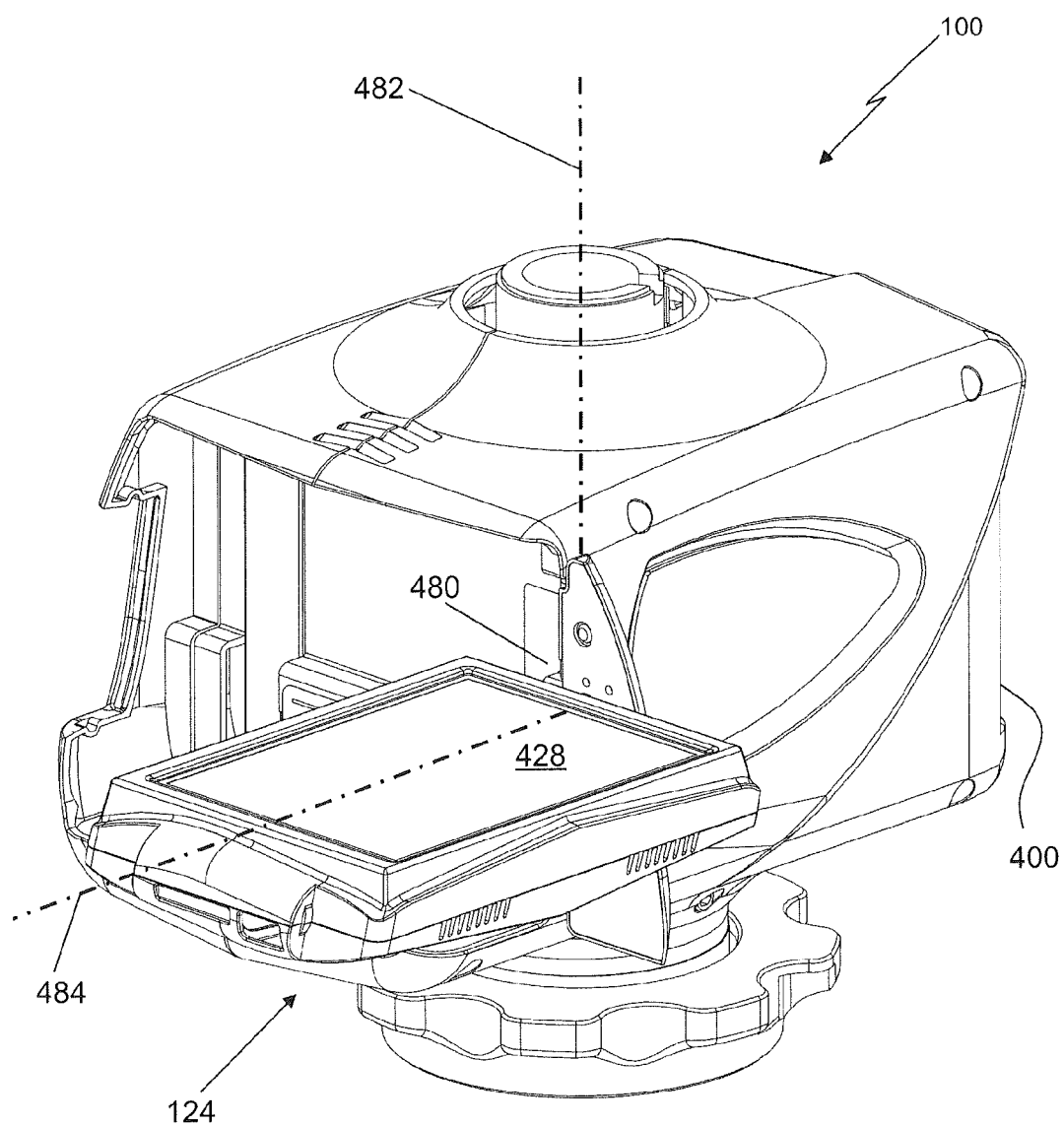
FIG. 12 is a perspective view of the AACMM of FIG. 11 with the display in another position.
Figure 13:
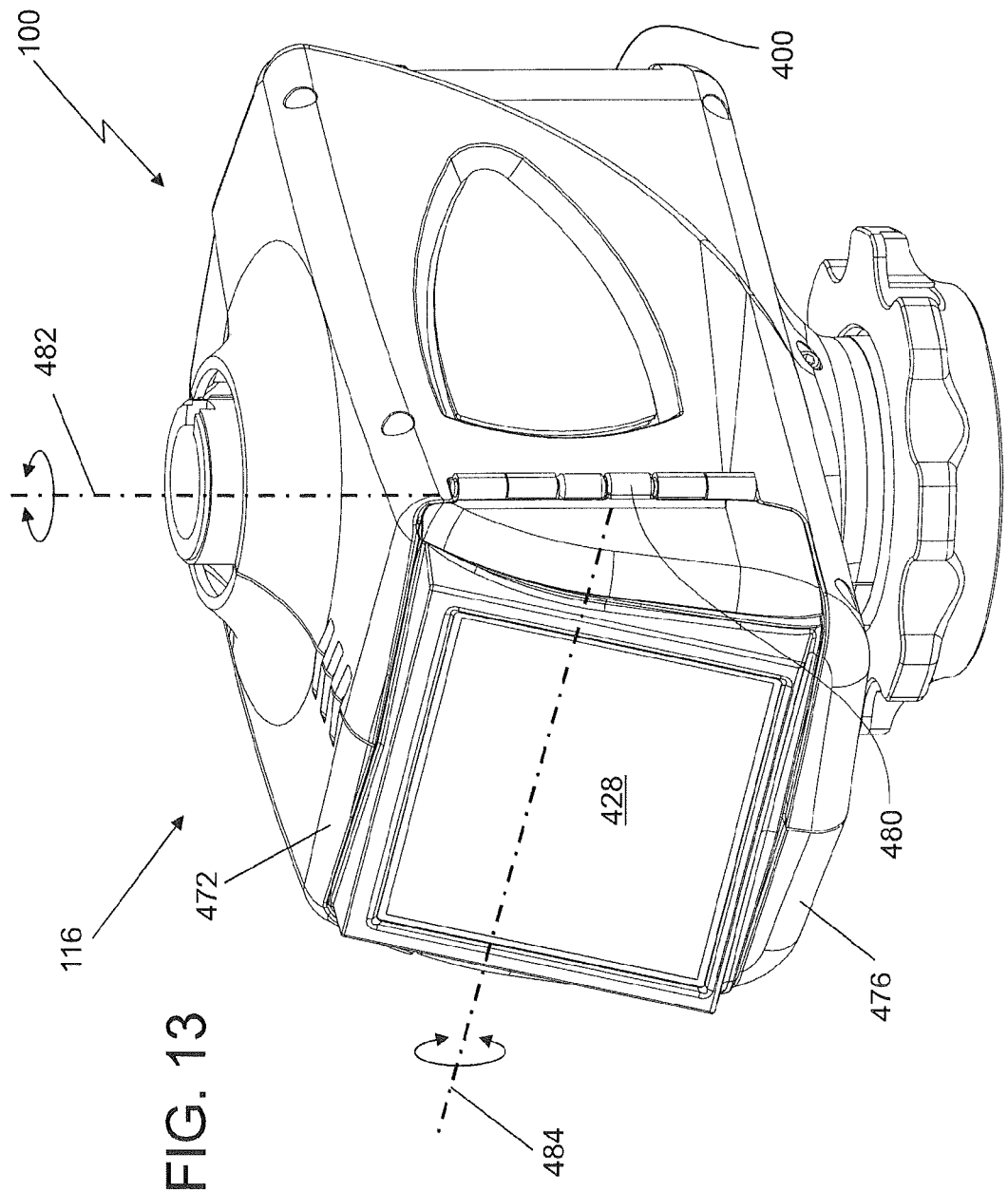
FIG. 13 is a perspective view of the AACMM of FIG. 11 with the display in yet another position.
Figure 14:
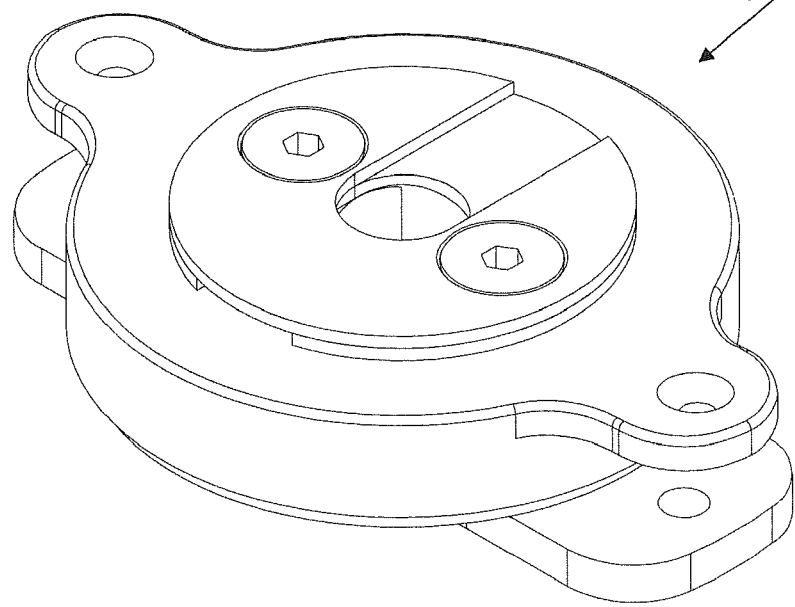
FIG. 14 is a perspective view of an embodiment of a hinge for use with the AACMM of FIG. 11.
Figure 15:
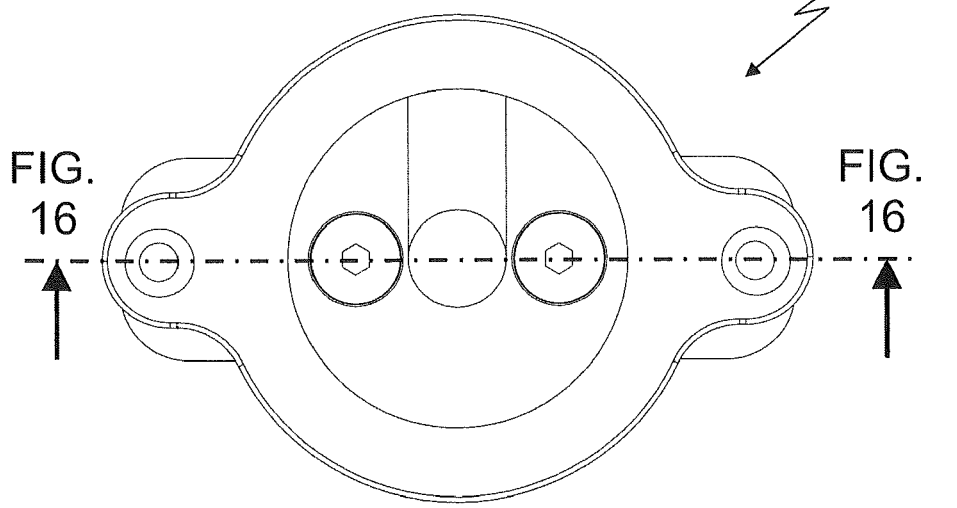
FIG. 15 is a top view of the hinge of FIG. 14.
Figure 16:
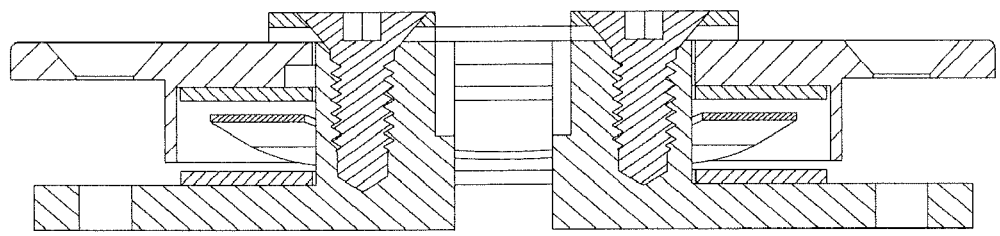
FIG. 16 is a sectional view of the hinge of FIG. 14.
Figure 17:
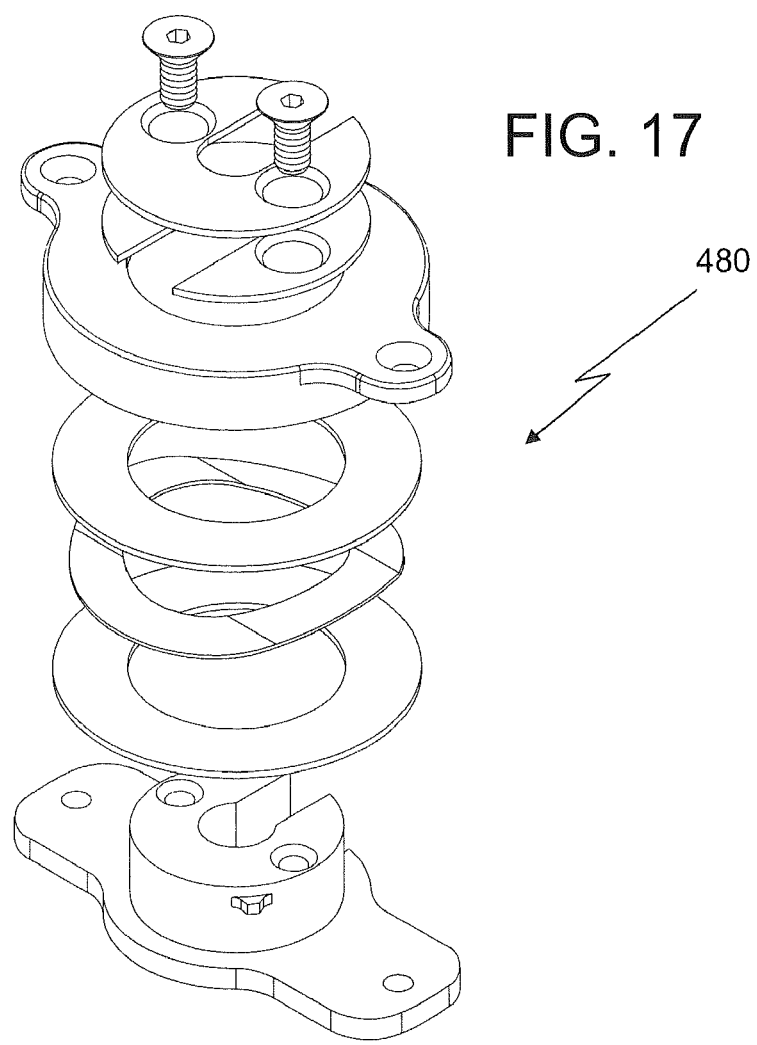
FIG. 17 is an exploded view of the hinge of FIG. 14.

Referring to FIGS. 11-13, another embodiment is shown of movable cover portion 124. In this embodiment, the base 116 includes a housing 400 with a recess 402 disposed on one end. The recess 402 is defined by an interior wall 470 and a plurality of side walls 472, 474, 476, 478. The movable cover portion 124 is coupled to the side wall 474 by a swivel hinge 480. The swivel hinge 480 couples the movable cover portion 124 to the housing 400 such that the movable cover portion 124 may be rotated about two independent axes 482, 484. This allows the operator to position the screen in substantially any position to facilitate viewing of the display screen 428. In one embodiment shown in FIG. 13, the movable cover portion 124 may be rotated such that the housing member 420 is arranged within the recess 402 with the display screen 428 facing away from the interior wall 470.

Referring to FIGS. 14-17, an embodiment is shown of swivel hinge 480. The swivel hinge 480 allows for rotation of movable cover portion 124 through a controlled range of angular motion while providing a pass-through for the cabling to the display electronics. The configuration of the swivel hinge 480 can support assembly of a cable with a relatively large connector already installed.

It should be appreciated that while embodiments herein describe an AACMM 100 having a display screen 428 that rotates or pivots relative to the base 116, this is for exemplary purposes and the claimed invention should not be so limited. In one embodiment, the cover 124 is integrated into the housing 400 such that the display screen 428 is arranged in a substantially fixed location on the base 116.

Embodiments of the present invention provide advantages for AACMM's by providing an integrated display and user interface that allows the operator to quickly move, install and operate the AACMM as an independent measurement device without need for connection to an external computer or communications network. Further advantages are that the articulated arm is configured to not interfere with the display screen thus preventing the potential for damage to either the screen or the probe tip. Still further advantages are provided that allow the rotation and positioning of the display screen to facilitate viewing by the operator. Technical effects and benefits of embodiments of the invention include the displaying of measurement values on an integrated screen allowing the AACMM to be operated as an independent and stand alone device.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine (AACMM), comprising:
    a base;
    a manually positionable articulated arm having opposed first and second ends, the arm being rotationally coupled to the base on the second end, the arm including a plurality of connected arm segments, each arm segment including at least one position transducer for producing a position signal;
    a measurement device attached to the first end;
    an electronic circuit which receives the position signals from the transducers and provides data corresponding to a position of the measurement device;
    a cover directly coupled to the base; and
    a display arranged within the cover and electrically coupled to the electronic circuit, the display having a screen surface disposed on one side of the cover.

2. The AACMM of claim 1 wherein
    the cover is movable between a closed position and an open position; and
    the screen surface is arranged adjacent the base in the closed position and disposed on an angle relative to the base in the open position.

3. The AACMM of claim 2 wherein the screen surface is arranged at an obtuse angle relative to the closed position when in the open position.

4. The AACMM of claim 2 further comprising at least one indicator coupled to the cover and arranged on a side opposite the screen surface.

5. The AACMM of claim 2 wherein the base includes a recessed area adjacent the cover, the cover being at least partially disposed in the recessed area in the closed position.

6. The AACMM of claim 2 further comprising a latch member disposed on one side of the cover, the latch member removably coupling the cover to the base when in the closed position, wherein the cover is rotationally coupled to the base by at least one hinge arranged on a side opposite the latch member.

7. The AACMM of claim 1 further comprising:
a controller disposed in the cover and operably coupled to the display, the controller coupled for communication with the electronic circuit.

8. The AACMM of claim 7 wherein the controller further includes at least one interface connection.

9. The AACMM of claim 1 wherein the display is a touch sensitive display.

10. The AACMM of claim 1 wherein the cover is coupled to rotate about a first axis and a second axis.

11. The AACMM of claim 1 wherein the base includes a handle portion disposed adjacent the cover.

12. A portable articulated arm coordinate measurement measuring machine (AACMM), comprising:
a base;
a manually positionable articulated arm having opposed first and second ends, the arm being rotationally coupled to the base on the second end, the arm including a plurality of connected arm segments, each arm segment including at least one position transducer for producing a position signal;
a measurement device attached to the first end;
an electronic circuit which receives the position signals from the transducers and provides data corresponding to a position of the measurement device;
a display rotationally coupled to the base between a closed position and an open position, the display having a screen disposed on one side wherein the screen is adjacent the base in the closed position; and
a controller operably coupled to the display and coupled for communication to the electronic circuit.

13. The AACMM of claim 12 wherein the base includes a recess on one side, the display being rotationally coupled to the base within the recess.

14. The AACMM of claim 13 further comprising:
a battery electrically coupled to the electronic circuit; and
wherein the recess includes an opening sized to receive the battery.

15. The AACMM of claim 14 further comprising a cover disposed about the display and the controller, wherein the screen is arranged on a side of the cover that is positioned within the recess when the display is in the closed position.

16. The AACMM of claim 12 wherein the screen is a touch sensitive screen.

17. The AACMM of claim 16 further comprising at least one computer interface operably coupled to the controller, the at least one computer interface being coupled to the screen.

18. The AACMM of claim 12 wherein the base includes a handle on one side.

19. A portable articulated arm coordinate measurement measuring machine (AACMM), comprising:
a base;
a manually positionable articulated arm having opposed first and second ends, the arm being rotationally coupled to the base on the second end, the arm including a plurality of connected arm segments, each arm segment including at least one position transducer for producing a position signal;
a measurement device attached to the first end;
an electronic circuit which receives the position signals from the transducers and provides data corresponding to a position of the measurement device; and
a display coupled to the base and electrically coupled to the electronic circuit, the display configured to rotate between a closed position and an open operational position;
wherein the plurality of connected arm segments are configured to define a path of an outer periphery of travel of the measurement device, the path separated from the display by a gap distance when the display is in the open operational position.

20. The AACMM of claim 19 wherein the gap distance is greater than zero.

21. The AACMM of claim 20 wherein the display is coupled to the base to rotate about a first axis and a second axis.

22. The AACMM of claim 20 further comprising:
a controller operably coupled to the display and electrically coupled to the electronic circuit; and
wherein the controller includes a processor responsive to executable computer instructions for displaying data derived from the at least one position transducer on the display in response to a first signal from the display.

23. The AACMM of claim 22 wherein the controller is further responsive to transmitting a second signal to the electronic circuit in response to a third signal from the display.

* * * * *